US009779593B2

(12) United States Patent
Cheatham, III et al.

(10) Patent No.: US 9,779,593 B2
(45) Date of Patent: *Oct. 3, 2017

(54) SYSTEMS AND METHODS FOR POSITIONING A USER OF A HANDS-FREE INTERCOMMUNICATION SYSTEM

(71) Applicant: Elwha LLC, Bellevue, WA (US)

(72) Inventors: Jesse R. Cheatham, III, Seattle, WA (US); Roderick A. Hyde, Redmond, WA (US); Muriel Y. Ishikawa, Livermore, CA (US); Jordin T. Kare, Seattle, WA (US); Craig J. Mundie, Seattle, WA (US); Nathan P. Myhrvold, Bellevue, WA (US); Robert C. Petroski, Seattle, WA (US); Eric D. Rudder, Mercer Island, WA (US); Desney S. Tan, Kirkland, WA (US); Clarence T. Tegreene, Mercer Island, WA (US); Charles Whitmer, North Bend, WA (US); Andrew Wilson, Seattle, WA (US); Jeannette M. Wing, Bellevue, WA (US); Lowell L. Wood, Jr., Bellevue, WA (US); Victoria Y. H. Wood, Livermore, CA (US)

(73) Assignee: ELWHA LLC, Bellevue, WA (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/461,106

(22) Filed: Aug. 15, 2014

(65) Prior Publication Data
US 2016/0049052 A1    Feb. 18, 2016

(51) Int. Cl.
G08B 7/00    (2006.01)
H04N 7/14    (2006.01)
(Continued)

(52) U.S. Cl.
CPC .............. G08B 7/00 (2013.01); G06F 3/167 (2013.01); H04M 11/025 (2013.01);
(Continued)

(58) Field of Classification Search
None
See application file for complete search history.

(56) References Cited

U.S. PATENT DOCUMENTS

| 4,941,166 A | 7/1990 | Waldman et al. |
| 5,345,226 A | 9/1994 | Rice, Jr. et al. |

(Continued)

FOREIGN PATENT DOCUMENTS

JP    11-145915 A    5/1999

OTHER PUBLICATIONS

Weebly, "If only I knew . . . " Jun. 8, 2013. pp. 1-3. http://ifonlyiknew52.weebly.com/you-learn-something-new-every-day/parametric-speakers.*

Primary Examiner — Curtis Kuntz
Assistant Examiner — Qin Zhu

(57) ABSTRACT

A hands-free intercom may include a user-tracking sensor, a directional microphone, a directional sound emitter, a display device, and/or a communication interface. The user-tracking sensor may determine a location of a user so the directional microphone can measure vocal emissions by the user and the directional sound emitter can deliver audio to the user. The hands-free intercom may induce the user to move to a desired location and/or to stay within a connectivity area. The hands-free intercom may also or instead induce the user to face in a desired orientation. The directional sound emitter and/or the display device may induce the user by explicitly indicating the desired location, by adjusting an apparent source of the audio or video, by changing quality of delivered audio or video based on user (Continued)

position, by producing irritating audio or video, and/or the like.

38 Claims, 20 Drawing Sheets

(51) Int. Cl.
| | |
|---|---|
| G06F 3/16 | (2006.01) |
| H04N 7/18 | (2006.01) |
| H04M 11/02 | (2006.01) |
| H04W 4/02 | (2009.01) |
| H04R 3/00 | (2006.01) |
| H04S 7/00 | (2006.01) |
| H04R 1/32 | (2006.01) |

(52) U.S. Cl.
CPC ............ *H04N 7/142* (2013.01); *H04N 7/147* (2013.01); *H04N 7/18* (2013.01); *H04N 7/186* (2013.01); *H04R 3/00* (2013.01); *H04W 4/02* (2013.01); *H04R 1/323* (2013.01); *H04R 1/326* (2013.01); *H04R 2217/03* (2013.01); *H04S 7/303* (2013.01)

(56) References Cited

U.S. PATENT DOCUMENTS

| | | | |
|---|---|---|---|
| 5,539,705 A * | 7/1996 | Akerman | ............... H04B 11/00 367/132 |
| 6,002,747 A | 12/1999 | Eftechiou | |
| 6,021,190 A | 2/2000 | Fuller et al. | |
| 6,049,598 A * | 4/2000 | Peters | .................... H04N 7/148 348/14.05 |
| 6,233,328 B1 | 5/2001 | Wolf | |
| 6,310,940 B1 | 10/2001 | Ratz | |
| 6,807,281 B1 | 10/2004 | Sasaki et al. | |
| 6,937,718 B2 | 8/2005 | Scholte | |
| 7,088,828 B1 | 8/2006 | Bradford et al. | |
| 7,106,180 B1 | 9/2006 | Pompei | |
| 7,130,430 B2 | 10/2006 | Milsap | |
| 7,184,047 B1 | 2/2007 | Crampton | |
| 7,269,452 B2 | 9/2007 | Cheung et al. | |
| 7,388,962 B2 | 6/2008 | Cheung et al. | |
| 7,391,872 B2 | 6/2008 | Pompei | |
| 7,492,913 B2 | 2/2009 | Connor et al. | |
| 7,551,060 B1 | 6/2009 | Seevers | |
| 7,567,659 B2 | 7/2009 | Kumagai | |
| 7,801,570 B2 | 9/2010 | Cheung et al. | |
| 7,835,529 B2 | 11/2010 | Hernandez et al. | |
| 8,027,488 B2 | 9/2011 | Pompei | |
| 8,126,159 B2 | 2/2012 | Goose et al. | |
| 8,189,825 B2 | 5/2012 | Breed | |
| 8,538,036 B2 | 9/2013 | Pompei | |
| 8,582,789 B2 | 11/2013 | Cheung et al. | |
| 8,640,021 B2 | 1/2014 | Perez et al. | |
| 8,861,537 B1 | 10/2014 | Braithwaite et al. | |
| 2001/0007591 A1 | 7/2001 | Pompei | |
| 2002/0198020 A1 | 12/2002 | Mooney | |
| 2003/0034876 A1 | 2/2003 | Puchek et al. | |
| 2003/0185404 A1 | 10/2003 | Milsap | |
| 2004/0042615 A1 | 3/2004 | Scholte | |
| 2004/0114770 A1 | 6/2004 | Pompei | |
| 2004/0114772 A1 | 6/2004 | Zlotnick | |
| 2004/0152482 A1 | 8/2004 | Raffel et al. | |
| 2004/0209654 A1 | 10/2004 | Cheung et al. | |
| 2004/0234080 A1 | 11/2004 | Hernandez et al. | |
| 2005/0007445 A1 * | 1/2005 | Foote | .................... H04N 7/142 348/14.08 |
| 2005/0207590 A1 | 9/2005 | Niehoff et al. | |
| 2005/0248233 A1 | 11/2005 | Pompei | |
| 2006/0063517 A1 | 3/2006 | Oh et al. | |
| 2006/0262935 A1 | 11/2006 | Goose et al. | |
| 2007/0154035 A1 | 7/2007 | Fukui | |
| 2007/0165866 A1 | 7/2007 | Super | |
| 2007/0169555 A1 | 7/2007 | Gao et al. | |
| 2007/0222617 A1 * | 9/2007 | Chai | .................... B60W 40/09 340/573.1 |
| 2007/0274533 A1 | 11/2007 | Lewis | |
| 2008/0037803 A1 | 2/2008 | Breed | |
| 2008/0285777 A1 | 11/2008 | Pompei | |
| 2008/0298571 A1 | 12/2008 | Kurtz et al. | |
| 2011/0044467 A1 | 2/2011 | Pompei | |
| 2011/0129101 A1 | 6/2011 | Hooley | |
| 2011/0249100 A1 | 10/2011 | Jayaram et al. | |
| 2011/0292051 A1 | 12/2011 | Nelson et al. | |
| 2012/0051556 A1 | 3/2012 | Pompei | |
| 2012/0093303 A1 | 4/2012 | Schultz | |
| 2013/0034262 A1 | 2/2013 | Surty et al. | |
| 2013/0089218 A1 | 4/2013 | Kishinami et al. | |
| 2013/0165208 A1 | 6/2013 | Nelson et al. | |
| 2013/0185061 A1 | 7/2013 | Arvanaghi et al. | |
| 2013/0190041 A1 | 7/2013 | Andrews et al. | |
| 2013/0216072 A1 * | 8/2013 | Freeman | ................. G06F 3/167 381/303 |
| 2014/0015967 A1 | 1/2014 | Moore et al. | |
| 2014/0071273 A1 | 3/2014 | Balthasar et al. | |
| 2014/0074472 A1 | 3/2014 | Lin et al. | |
| 2014/0152758 A1 | 6/2014 | Tong et al. | |
| 2014/0219431 A1 | 8/2014 | Wagner et al. | |
| 2014/0270284 A1 | 9/2014 | Luna | |
| 2014/0310764 A1 | 10/2014 | Tippett et al. | |
| 2015/0031342 A1 | 1/2015 | Lorenzo | |
| 2015/0057999 A1 | 2/2015 | Leorin et al. | |
| 2015/0133025 A1 | 5/2015 | Ponomarev et al. | |
| 2016/0080165 A1 | 3/2016 | Ehsani et al. | |

\* cited by examiner

SYSTEMS AND METHODS FOR POSITIONING A USER OF A HANDS-FREE INTERCOMMUNICATION SYSTEM

If an Application Data Sheet ("ADS") has been filed on the filing date of this application, it is incorporated by reference herein. Any applications claimed on the ADS for priority under 35 U.S.C. §§119, 120, 121, or 365(c), and any and all parent, grandparent, great-grandparent, etc., applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)).

PRIORITY APPLICATIONS

None

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This application relates to systems and methods for automatically handing off calls to a hands-free intercommunication system.

SUMMARY

A hands-free intercommunication system ("hands-free intercom") may be able to communicatively couple a user to an entity of interest without requiring a tactile input and/or a specific verbal phrase. The hands-free intercom may be able to determine from gestures, facial expressions, eye tracking, and/or vocal emissions with whom the user wishes to speak. For example, the hands-free intercom may determine the entity of interest from the subject matter of the vocal emissions, a tone of voice, an uttered name, a spoken command, a prosody, an amplitude, and/or the like. A communication interface may be configured to communicatively couple the user to a communication device of the entity of interest. The communication interface may determine an optimal communication device of the entity of interest with which to communicatively couple.

The hands-free intercom may include a directional microphone to receive vocal emissions from the user and a directional sound emitter to deliver audio to the user. The communication interface may communicatively couple the directional microphone and directional sound emitter to the communication device of the entity of interest to allow the user and entity of interest to communicate. The hands-free intercom may also include a user-tracking sensor configured to determine the location of the user. The directional microphone and directional sound emitter may target the user based on the location determined by the user-tracking sensor. The directional microphone may include a phased array and/or a metamaterial array to permit gain to be maximized in the direction of the user without any moving parts. The directional sound emitter may be configured to emit ultrasonic sound waves towards the user. The emitted ultrasonic sound waves may be configured to frequency convert to produce audio that is audible by the user. The frequency conversion may be produced by beating a plurality of ultrasonic sound waves together, by downshifting the ultrasonic sound waves in the air and/or in or on a material on the user, and/or the like.

The hands-free intercom may determine whether a remote entity requesting to communicatively couple with the user should be allowed to do so. The hands-free intercom may apply access rules based on context data, which may include data about the remote entity, sensing of the user, data from one or more computer systems, and/or the like. The hands-free intercom may decide whether to automatically couple the remote entity, automatically refuse to couple the remote entity, prompt the user about the remote entity, and/or the like. The hands-free intercom may refuse connections, for example, if the user is sleeping, if another person is present with the user, and/or the like. The hands-free intercom may monitor for eavesdroppers and may warn the user of an eavesdropper and/or refuse to communicatively couple the user while the eavesdropper is present.

The hands-free intercom may be configured to automatically receive call handoffs from mobile communication devices. A user may be communicatively coupled to a remote entity via a mobile communication device of the user. To hand off the call, the directional microphone and/or directional sound emitter may be communicatively coupled to a communication device of the remote entity. The directional microphone and/or directional sound emitter may be communicatively coupled to the mobile communication device of the user, which may remain coupled to the remote entity. Alternatively, the communication interface may communicatively couple with the remote entity without sending communications via the mobile communication device of the user. The user may indicate through vocal emissions, gestures, facial expressions, and/or eye movements that the communicative coupling should be handed off; the mobile communication device may indicate the communicative coupling should be handed off; the communication interface may automatically determine that the communicative coupling should be handed off (e.g., anytime the user is in range); and/or the like.

The hands-free intercom may be configured to automatically communicatively couple a user to an appliance. The communication interface may be configured to communicatively couple the directional microphone and/or the directional sound emitter to the user. The user may indicate that the user would like to be communicatively coupled with the appliance though vocal emissions, gestures, facial expressions, eye movements, and/or the like. The communication interface may deliver notifications from the appliance to the user. The communication interface may allow the user to send and/or receive communications via a mobile communication device. The communication interface may translate communications from appliances to be understandable by users and/or from user to be understandable by appliances. The communication interface may communicatively couple appliances with one another.

The communication interface may manage access rights between users and/or appliances. The communication interface may determine which users may access the appliances and what privileges they have when access is permitted. The communication interface may determine when and/or if an appliance is permitted to send notifications to the user. The communication interface may determine when communication between an appliance and a mobile communication device are permitted. The communication interface may determine whether appliances are permitted to communicate with one another.

The hands-free intercom may be configured to provide video aided communicative coupling. The hands-free intercom may include a directional camera and/or a directional video projector. Alternatively, or in addition, the communication interface may be configured to leverage the cameras of one or more other devices. The directional and/or other cameras may be configured to capture video of the user, which may be provided to a remote entity and/or may be used to track eye-movement and/or to identify vocal emissions, gestures, and/or facial expressions from the user. The directional video projector may be configured to deliver video to the user. For example, the video may be projected into and/or onto the eye of the user. The projected video may be received from the remote user and/or may include status information. The captured video and/or the projected video may be stereoscopic video. The communication interface may be configured to determine whether to provide captured video to the remote entity and received video to the user based on access rules.

The hands-free intercom may be configured to induce the user to move to a desired location and/or to stay within a connectivity boundary. Alternatively, or in addition, the hands-free intercom may be configured to induce the user to face in a desired orientation. The desired location and/or orientation may be a location or orientation where performance by and/or connectivity with one or more components of the hands-free intercom is best. The connectivity boundary may be one or more locations where connectivity is lost with a component of the hands-free intercom and/or performance is below a predetermined threshold. In some embodiments, the directional sound emitter and/or a display may provide the inducement to the user. For example, the directional sound emitter and/or the display may explicitly indicate the desired location, desired orientation, and/or connectivity boundary; may degrade audio or video quality based on user position or orientation; may manipulate the apparent source of the audio or video; may produce irritating audio and/or video; and/or the like. Alternatively, or in addition, the inducement may be adjusted based on changes in the position and/or orientation of the user.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF PREFERRED EMBODIMENTS

Figure 1:
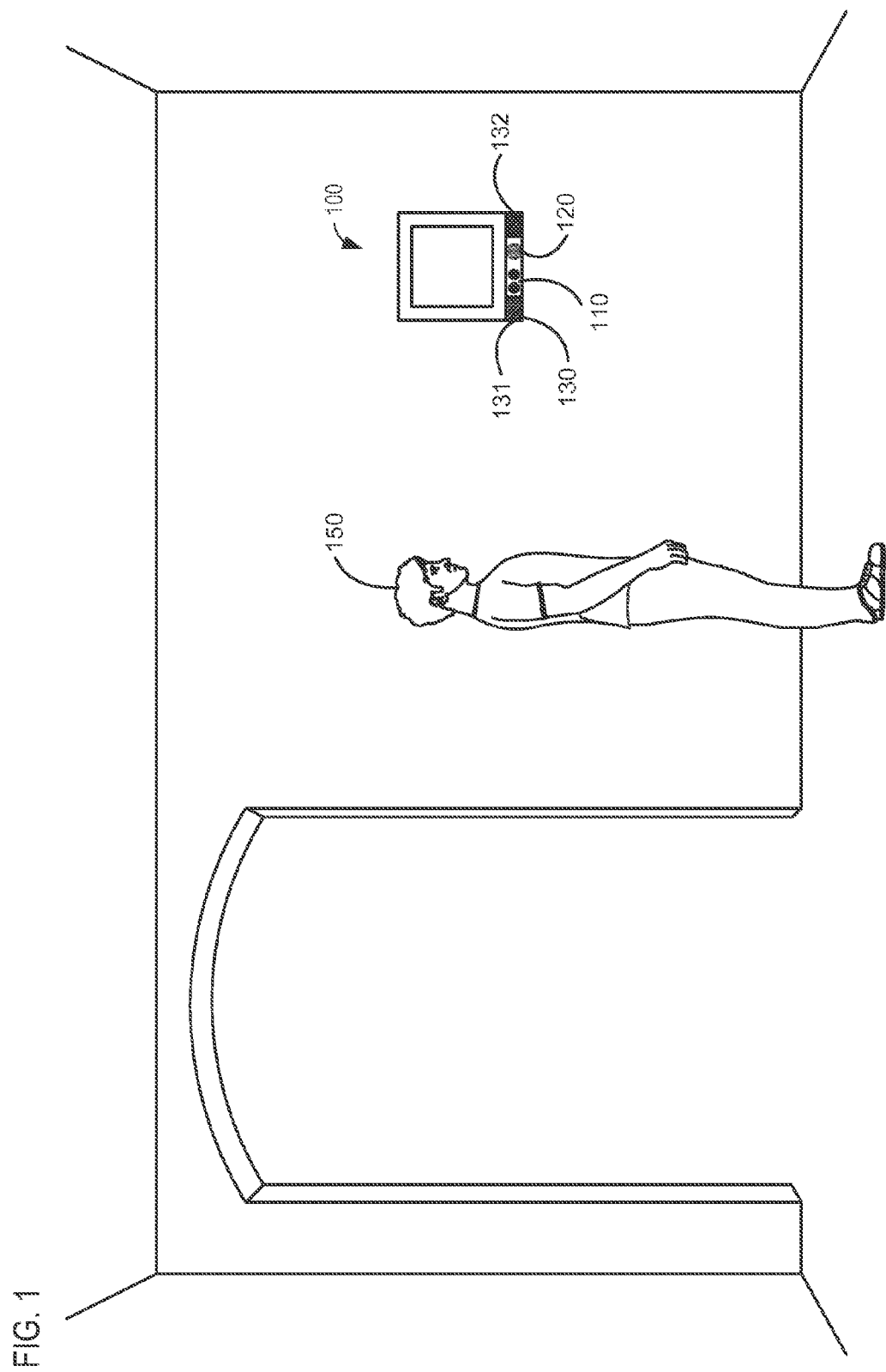
FIG. 1 is a perspective view of a user interacting with a hands-free intercom.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A conventional intercom may be able to communicatively couple users (e.g., occupants of a building, occupants of a vehicle, etc.) to each other via a plurality of user interfaces. Unfortunately, the intercom may require a tactile input to specify a desired interface rather than being able to determine a desired user based on a non-tactile input, such as a gesture, facial expression, eye movement, or a verbal input. The intercom may require the user to wear or carry communication equipment, such as a microphone, a speaker, or a wireless transceiver. The intercom may also be unable to interact with other systems, such as cell phone networks, computer networks, local appliances, local computers, and/ or the like, and thus may only be able to interact with entities via the user interfaces. The intercom may also require the user to select which device to communicate with rather than the intercom automatically selecting the communication device based on the user to be contacted. The intercom may lack access and privacy control. For example, the intercom may connect a remote entity to the user regardless of the time, who is with the user, the identity of the remote entity, etc. The intercom may not protect against eavesdroppers or keep conversations private from others near the user. Therefore, there is a need for an improved intercom that remedies these deficiencies.

A hands-free intercom may include a user-tracking sensor to determine a location of a user, a directional microphone configured to target the user and measure vocal emissions by the user, a directional sound emitter configured to target the user and deliver audio to the user, and a communication interface configured to communicatively couple the user to an entity of interest (e.g., by communicatively coupling the directional microphone and directional sound emitter to a communication device of the entity of interest). The directional microphone and directional sound emitter may be located remotely from the user. The directional microphone and directional sound emitter may be wirelessly coupled to the communication interface, wired to the communication interface, and/or the like. The directional microphone may include a phased array, a metamaterial array (e.g., an acoustic analog of metamaterial surface antenna technology), and/or the like. The directional microphone and the directional sound emitter may receive an indication of the location of the user from the user-tracking sensor and may target the indicated location for measurement of vocal emissions and delivery of audio. The directional microphone and/or directional sound emitter may move focal direction as the user moves to track the user. The directional sound emitter may be configured to emit ultrasonic sound waves configured to frequency convert to produce desired sounds that are audible to the user. The ultrasonic waves, by virtue of their short wavelengths, can be selectively directed and focused to the user without spreading to other regions; in some embodiments, different ultrasonic waves can be directed to the left and right ears of the user. For example, the ultrasonic sound waves may be premodulated with audible-frequency signals and then be nonlinearly frequency downshifted in the air and/or frequency downshifted in a nonlinear acoustic material in or on the user (e.g., natural tissue near the ear, or nonlinear material in an earpiece) so as to produce audible sounds. The premodulation can be selected such that the audible sounds produced following the nonlinear frequency downshifting form desired sounds, e.g., intelligible human speech. Alternatively, or in addition, a plurality of ultrasonic sound waves may be beat together to frequency convert to the desired frequency. For instance, a 100 kHz wave can be beat together in a nonlinear material (e.g., air, tissue, or an earpiece) with a modulated beam having frequencies of 102-120 kHz to generate audible sounds with frequencies between 2 kHz and 20 kHz.

The communication interface may identify the entity of interest based on a non-tactile input received from the user. In an embodiment, the user-tracking sensor and/or an associated camera may detect a gesture by the user indicative of the entity of interest. For instance, the user may employ 8 different gestures to identify eight different entities of interest. In one embodiment, the user may use fingers or other gestures to display numbers or letters which identify the entities of interest (e.g., from a list). In another embodiment, the user may simply use a pointing gesture to identify a nearby entity of interest. The gestures may include purposely employed eye movements or facial expressions, such as a blink, a purposely raised eyebrow, etc. For example, a user with a disability may be able to use a facial gesture rather than an arm or hand gesture.

Alternatively, or in addition, the directional microphone may receive vocal emissions from which the communication interface identifies the entity of interest. For example, the vocal emissions may include a spoken command, a name of the entity of interest, and/or the like, and/or the communication interface may identify the entity of interest based on a tone of voice, a subject matter of the vocal emission, a prosody, an amplitude, and/or the like. Such identifiers need not be by themselves globally unique, but can serve to identify the entity of interest from a limited list of likely entities of interest. For example, if the user has only one acquaintance named Sam, he can identify him by Sam rather than by Samuel James Tyler. Or, if he has 5 acquaintances named William, the phrase "Bill, what did you think of yesterday's meeting" may be sufficient to identify the specific entity of interest, based on the partial name and the joint attendance at a defined meeting. The communication interface may be configured to add additional participants based on vocal emissions, gestures, facial expressions, and/or eye movements by the user, which may be used with any or all of the previous discussed methods of identifying the entity of interest.

The communication interface may perform one or more speech recognition algorithms on the vocal emissions to identify the subject matter of the vocal emissions. The communication interface may track one or more previous subject matters of one or more previous conversations and/or may store one or more keywords from one or more previous conversations, which may then be used to identify the entity of interest. There may be one or more than one subject matter and/or keyword per conversation, and/or a subject matter and/or keyword may be associated with multiple conversations. The communication interface may gather information from an external source (e.g., a website, such as a social media site, and/or the like) to identify the entity of interest. The communication interface may identify the entity of interest based on a recency in time of a previous conversation. The communication interface may simply select a most recent conversation, may weight conversations based on recency and relevance, and/or the like. The communication interface may select the entity of interest based on a single most relevant and/or recent conversation and/or based on a plurality of conversations with the entity of interest. The communication interface may identify the entity of interest based on a physical proximity to the user (e.g., the entity of interest is in an adjacent room, a location of the entity of interest determined by a satellite positioning system, etc.). The communication interface may identify the entity of interest based upon a calendar of the user, e.g., based on the time of a scheduled conversation, the relative order of several scheduled conversations, or the like.

The communication interface may analyze the subject matter of the vocal emissions and/or previous conversations using a language analysis algorithm. In an embodiment, the communication interface may weight the results from a plurality of language analysis algorithms to determine the subject matter of the vocal emissions and/or previous conversations. The communication interface may reject an identification of the entity of interest if a confidence score is below a predetermined threshold. If the identification is rejected, the communication interface may prompt the user to specify the entity of interest. The communication interface may suggest a most likely candidate (e.g., one with a highest confidence score) when prompting the user. In an embodiment, the communication interface may use the language of the vocal emissions to help identify the entity of interest.

The communication interface may be configured to identify the entity of interest solely in response to the vocal emissions without the hands-free intercom first receiving a tactile input. Alternatively, or in addition, the communication interface may determine whether the user would like to communicate using the hands-free intercom without first receiving a predetermined phrase. The communication interface may determine whether the user is talking to an entity other than the user's self, e.g., based on the subject matter, prosody, amplitude, etc. of the user's utterances. The communication interface may determine whether the user is talking to a nonresponsive object, such as a plant.

The communication interface may be configured to determine whether or not the entity of interest is within listening range of the user and may communicatively couple the user to the entity of interest if the entity of interest is not within listening range. The communication interface may determine whether the entity of interest is within listening range based on responsive vocal emissions and/or the lack thereof by the entity of interest. The communication interface may determine whether the entity of interest is within listening range based on responsive motion from the entity of interest (e.g., head motion, body motion, eye motion, etc.). The communication interface may determine whether the entity of interest is within listening range based on a measured volume of the vocal emissions (e.g., a volume measured by a directional microphone near the user, a volume measured by a directional microphone near the entity of interest, etc.). The communication interface may determine whether the entity of interest is within listening range based on whether entities of interest were able to hear vocal emissions by the user in previous instances under similar circumstances.

The communication interface may select the entity of interest from among one or more entities being tracked by the user-tracking sensor and/or a plurality of user-tracking sensors. The user-tracking sensor and/or plurality of user-tracking sensors may occupy a plurality of locations and/or structures. The communication interface may select the entity of interest from among one or more entities that nominally occupy a structure, such as a structure containing the hands-free interface. The communication interface may select the entity of interest from among one or more entities on a contact list, such as a cell phone contact list, a member/employee list for an organization, and/or the like, and/or from among a user-identified set of entities from the contact list (e.g., a set smaller than the entire contact list). The communication interface may select the entity of interest from among family members of the user. In some embodiments, the entity of interest may be a domesticated animal, such as a pet. The communication interface may select the entity of interest from among frequently contacted entities. The communication interface may identify the entity of interest, for example, based on a spoken name, vocal characteristics, a code phrase, facial recognition, and/or the like. The entity of interest may be identified based on which user is using the hands-free intercom.

The communication interface may be configured to determine the communication device to which to couple based on an identity of the entity of interest, a location of the entity of interest, and/or the like. The communication interface may be configured to determine whether the entity of interest is located in a structure containing the hands-free intercom, a structure containing another hands-free intercom, a home, a workplace, a vehicle, and/or the like. The communication interface may be configured to determine whether the entity of interest is accessible via a computer system, such as if the entity of interest is logged into a computer communication service. The communication interface may be configured to determine whether a mobile communication device of the entity of interest (e.g., a cell phone, tablet, etc.) is communicatively coupled to a wireless network. If the communication device is external to the hands-free intercom, external to a structure in which the user is located, and/or the like, the communication interface may encrypt the communicative coupling.

The communication device of the entity of interest may be part of the hands-free intercom. For example, another directional microphone and another directional sound emitter may couple the entity of interest to the user. The communication interface may locate the entity of interest using the user-tracking sensor. For example, the user-tracking sensor may identify the entity of interest based on a gait, a breathing sound, a breathing rate, facial recognition, and/or the like. The communication interface may locate the entity of interest based on a location of a mobile communication device of the entity of interest, for example, by detecting the location of wireless transmission by the mobile communication device, by receiving the location from the mobile communication device, by using a phone number of the mobile communications device, and/or the like. The communication interface may locate the entity of interest based on a beacon coupled to the entity of interest, such as a beacon configured to transmit a signal (e.g., a radio frequency signal, an infrared signal, an electromagnetic signal, an ultrasonic signal, etc.), a beacon configured to distinctively reflect a signal, and/or the like. The communication interface may locate the entity of interest by tracking which doorways the entity of interest has traversed (e.g., by tracking the last doorway traversed by the entity of interest). The hands-free intercom may include sensors configured to detect passage of the entity of interest through doorways. Once the entity of interest is located, the communication interface may couple the user to a directional microphone and directional sound emitter closest to the entity of interest. Alternatively, the communication interface may couple the user to a cell phone, work phone, internet phone or communication service, and/or the like, for example, if the entity of interest is not near a user interface of the hands-free intercom. Accordingly, the communications interface may connect to the entity of interest's communication device via an existing communications network, such as a cellular network, a Wi-Fi network, the internet, a wired network, a wireless network, etc. In an embodiment, the communication device of the entity of interest can interact with the user's communication interface without consideration that the user is employing a hands-free intercom, e.g., just as it would interact with a wired or wireless phone.

The communication interface may be configured to summon the entity of interest to a nearest communication device. The communication interface may summon the entity of interest by playing a loud, undirected sound (such as a name, vocal emissions from the user, a tone, etc.) from a sound emitter nearest the entity of interest, by transmitting a text message, by transmitting an email, and/or the like. The communication device may receive a communications request from the communications interface and may summon the entity of interest via summoning signals from the device, such as ringtones, vibrations, lights, etc. The communication device may include a mobile communication device, the hands-free intercom, another hands-free intercom, a computer system, and/or the like.

The communication interface may be configured to determine the availability of the entity of interest. The communication interface may report the determined availability to the user (e.g., using a visual indication, an audible indication, etc.). In some embodiments, the determined availability may be reported only if the entity of interest is unavailable. The availability may include available, occupied, in a call, and/or the like. The communication interface may update the user on the availability of the entity of interest when the availability changes.

The communication interface may be configured to record vocal emissions from the user (e.g., the vocal emissions used to identify the entity of interest) and deliver the recorded vocal emissions after identification of the entity of interest. In some embodiments, the communication interface may strip-out identification phrases before delivering the body of the message. In other embodiments, the identification material forms part of the body of the message and can be analyzed, used to identify and connect to the entity of interest, and then delivered to him. The communication interface may disguise a connection delay from being observable by the entity of interest. The communication interface may deliver an audio indication to the user prior to delivery of the recorded vocal emissions to the entity of interest. The audio indication may include a contact status indicator associated with the communication device, such as a ringing a sound, a busy sound, and/or the like. The communication interface may be configured to mute, pause, terminate, etc. the communicative coupling responsive to a vocal command by the user, a gesture by the user (e.g., a facial gesture, an arm gesture, a hand gesture, etc.), eye movements by the user, and/or the like. The communication interface may also, or instead, be configured to mute, pause, terminate, etc. the communicative coupling responsive to a command from the entity of interest, such as a vocal command, an electronic signal from the communication device, and/or the like. The hands-free intercom may indicate to the user when the communicative coupling is paused and/or terminated.

The communication interface may receive a request from a remote entity to communicatively couple to the user. The communication interface may determine whether to couple the remote entity to the user, for example, based on one or more access rules. The communication interface may determine whether to couple the remote entity to the user based on which room the user is occupying (e.g., a bedroom, a bathroom, an office, a kitchen, etc.), based on an activity of the user (e.g., an activity determined by the user-tracking sensor), based on a time of day, based on a day of the week, and/or the like. In an embodiment, the access rules may include room-specific time restrictions. The communication interface may be configured to determine whether to couple the remote entity to the user based on an identity of the remote entity. For example, the communication interface may connect the remote entity without prompting, refuse the request to couple, prompt the user on whether to couple, and/or the like depending on the identity of the remote entity. The communication interface may determine whether to couple the remote entity to the user based on an identity of the user.

The communication interface may determine whether to couple the remote entity by prompting the user, and/or the communication interface may determine whether to prompt the user based on access rules. The user may accept the communicative coupling with a vocal command, a gesture (e.g., a facial gesture, an arm gesture, a hand gesture, etc.), eye movements, and/or the like. The user may be able to accept a communication without speaking or even responding to the communication. For example, the remote entity may deliver a communication without expecting a response, and/or the user may be unable to respond to communications. In an embodiment, the user may be an appliance, and the communication interface may determine whether the remote entity can couple to the appliance. In an embodiment, the remote entity may be an appliance, and the communication interface may determine whether the user can couple to the appliance (e.g., whether he is authorized to do so).

The communication interface may be configured to determine whether to couple the remote entity to the user based on a subject matter of the request, an urgency level, a user status received from an electronic calendar, an indication of user availability received from the user, and/or the like. The communication interface may be configured to prompt the user periodically to update the indication of user availability when the user has indicated unavailability. The communication interface may receive an indication of a user-specified period for prompting at the time the user indicates unavailability. The communication interface may determine whether to couple the remote entity to the user based on whether the user is alone, based on an identity of a person near the user, based on a relationship between the remote entity and the person near the user, based on a relationship between a subject matter and the person near the user, and/or the like. The communication interface may be configured to determine whether to forward the request to a user device when the user is out of range of the sound emitter. The communication interface may determine whether to forward the request based on the user device to which the request would be forwarded, based on an identity of the remote entity, and/or the like.

The user-tracking sensor may be configured to detect an eavesdropper. The hands-free intercom may warn the user when an eavesdropper is present. The hands-free intercom may produce an audio indication that an eavesdropper is present (e.g., a tone, a buzz, a vocal indication, etc.), a visual indication that an eavesdropper is present (e.g., a light, etc.), and/or the like. The communication interface may refuse to communicatively couple when an eavesdropper is present. The user-tracking sensor may be configured to detect eavesdroppers in the same room as the user, to detect eavesdroppers within a listening range of the user (e.g., to detect eavesdroppers outside a doorway of a room with the user), and/or the like. The user-tracking sensor may be configured to continuously monitor for eavesdroppers during communicative coupling.

The hands-free intercom may be configured to automatically receive call handoffs, for example, from mobile communication devices. The communication interface may be configured to determine the user is communicatively coupled to a remote entity via a mobile communication device of the user. The communication interface may be configured to communicatively couple the directional microphone and/or the directional sound emitter to a communication device of the remote entity.

In an embodiment, the communication interface may be configured to communicatively couple the directional microphone and/or the directional sound emitter to the user's mobile communication device to communicatively couple them with the remote entity. For example, the directional microphone and/or sound emitter may be configured to act as peripherals for the user's mobile communication device, and the user's mobile communication device may treat them as such. The communication interface may be configured to communicatively couple the directional microphone and/or directional sound emitter to the user's mobile communication device using a short distance wireless protocol, such as Bluetooth, Wi-Fi, etc. The communication interface may be configured to pair with the mobile communication device prior to coupling.

The communication interface may instruct the user's mobile communication device to disable a local microphone and/or a local sound emitter before, during, or after coupling. The communication interface may instruct the user's mobile communication device to perform one or more actions to save power. The one or more actions may include dimming a display, turning off a display, reducing communication with a service provider, and/or the like. The communication interface may compare the quality of the communicative coupling of the directional microphone and/or directional sound emitter with the remote entity's communication device to the quality of the communicative coupling of the user's mobile communication device with the remote entity's communication device. The communication interface may perform the comparison before terminating the communicative coupling between the user's mobile communication device and the remote entity's communication device and/or before instructing the user's mobile communication device to disable the local microphone and/or local sound emitter.

In some embodiments, the communication interface may be configured to communicatively couple the directional microphone and/or the directional sound emitter to the remote entity's communication device over a communication network without routing communications through the mobile communication device of the user. The communication interface may transmit a request to the user's mobile communication device to transfer the communicative coupling with the remote entity. The user's mobile communication device may provide the request to a service provider. Alternatively, or in addition, the communication interface may transmit the request to transfer the communicative coupling directly and/or indirectly to the service provider. The communication interface may verify with the service provider that the user's mobile communication device is proximate to the communication interface and/or may verify that the user's mobile communication device has provided permission to hand off the coupling. The service provider may also, or instead, verify proximity and/or permission to hand off directly with the user's mobile communication device.

The communication interface may be configured to communicatively couple with the user's mobile communication device and route communications between the user's mobile communication device and the remote entity's communication device (e.g., while the user is still interfacing with the local microphone and/or local sound emitter of the user's mobile communication device). The communication interface may next communicatively couple the directional microphone and/or directional sound emitter to the communication device of the remote entity. The communication interface may then disconnect the user's mobile communication device from the remote entity's communication device. The communication interface may communicatively couple with the user's mobile communication device using a wireless network protocol (e.g., Wi-Fi, etc.), a mobile communication device protocol (e.g., a cellular protocol, such as Wi-MAX, LTE, etc.), and/or the like. In an embodiment, the communication interface may act as a cellular base station for the user's mobile communication device. Alternatively, the communication interface may initially couple the directional microphone and/or direction sound emitter with the mobile communication device prior to directly coupling with the remote entity.

The communication interface may determine the user is communicatively coupled to the remote entity by detecting vocal emissions by the user (e.g., using the directional microphone). For example, the communication interface may determine the user is communicatively coupled to the remote entity based on the content of the vocal emissions. Alternatively, or in addition, the communication interface may determine the user is communicatively coupled to the remote entity by receiving an indication from the user-tracking sensor that the remote entity is outside of listening distance of the user, by receiving an indication from the user-tracking sensor of the position of the user's mobile communication device (e.g., next the user's ear), by prompting the user's mobile communication device for a status, by receiving a notification from the user's mobile communication device, and/or the like. The notification may be transmitted by the user's mobile communication device in response to a transmission by the communication interface of its availability to couple. The transmission by the communication interface may be sent directly to the user's mobile communication device, may be sent indirectly (e.g., via a service provider) to the user's mobile communication device, may be broadcast to a plurality of devices within listening range, may be transmitted directionally to the user's mobile communication device, and/or the like.

The communication interface may be coupled, paired, and/or the like with the user's mobile communication device prior to the user coupling with the remote entity and/or a decision to hand off a coupling. The communication interface may be configured to determine the user is communicatively coupled to the remote entity by receiving a wake-up notification from the user's mobile communication device, by receiving a notification from the user's mobile communication device without prompting, by receiving data intended for the directional sound emitter from the user's mobile communication device, by receiving a request from the user's mobile communication device for data (e.g., vocal emissions) from the directional microphone, and/or the like.

The communication interface may determine the directional microphone and/or directional sound emitter should be communicatively coupled to the remote entity's communication device based on a user gesture, facial expression, and/or eye movement detected by the user-tracking sensor. The communication interface may determine the directional microphone and/or directional sound emitter should be communicatively coupled to the remote entity based on vocal emissions received by the directional microphone and/or the local microphone. The vocal emissions may indicate that the directional microphone and/or directional sound emitter should be communicatively coupled to the remote entity. Alternatively, or in addition, the user's mobile communication device may be configured to determine when to communicatively couple the directional microphone and/or directional sound emitter to the remote entity. For example, the user's mobile communication device may receive a user input and/or may automatically determine the directional microphone and/or directional sound emitter should be communicatively coupled to the remote entity.

The communication interface may update the user's mobile communication device and/or a service provider with a status of a communicative coupling of the directional microphone and/or directional sound emitter with the user and/or the remote entity. The communication interface may transmit a notification to the user's mobile communication device and/or the service provider that the directional microphone and/or the directional sound emitter are or are not communicatively coupled to the user. The communication interface may transmit a notification to the user's mobile communication device and/or the service provider that the directional microphone and/or the directional sound emitter are not available to be communicatively coupled to the user (e.g., to inform the user's mobile communication device and/or the service provider not to attempt a hand-off).

The communication interface may terminate the communicative coupling between the remote entity and the directional microphone and/or directional sound emitter, may hand off the communicative coupling to another directional microphone and/or another directional sound emitter, and/or may hand off the communicative coupling back to the user's mobile communication device under certain circumstances. For example, the communication interface may determine that the user is leaving the range of the directional microphone and/or the directional sound emitter (e.g., by using the user-tracking sensor, by analyzing the amplitude of vocal emissions, and/or the like). The communication interface and/or the user-tracking sensor may be configured to predict a likelihood that the user will leave the range, to predict a time at which the user will leave the range, and/or the like. The communication interface and/or the user-tracking sensor may determine the user is leaving the range based on at least one of a location of the user, a direction of motion of the user, a velocity of the user, and/or the like. The communication interface and/or the directional microphone may be configured to determine the user is leaving the range based on a sound quality received by the directional microphone.

The communication interface may also, or instead, determine that the user's mobile communication device is leaving the range of a communicative coupling between the communication interface and the user's mobile communication device and/or that another cellular base station would provide a stronger cellular signal. The user may indicate that the communicative coupling between the directional microphone and/or the directional sound emitter and remote entity's communication device should be terminated and/or handed off. For example, the user-tracking sensor may be configured to receive a user gesture and/or detect a facial expression and/or eye movement and/or the directional microphone may be configured to receive vocal emissions indicating the communicative coupling should be terminated and/or handed off.

The directional sound emitter may alert the user prior to terminating the communicative coupling between the directional microphone and/or directional sound emitter and the remote entity. The communication interface may be configured to determine whether the user stays within the range of the directional microphone, directional sound emitter, and/or communication interface in response to the alert (e.g., by using the user-tracking sensor, by analyzing the amplitude of vocal emissions, by monitoring signal strength, and/or the like). The communication interface may be configured to indicate to the user's mobile communication device and/or a service provider that the communicative coupling between the directional microphone and/or directional sound emitter and the remote entity's communication device is being terminated. The communication interface may be configured to indicate to the user's mobile communication device and/or a service provider that a communicative coupling should be established between the user's mobile communication device and the remote entity's communication device.

The user's mobile communication device may be configured to determine that the communicative coupling between the directional microphone and/or the directional sound emitter and the remote entity should be terminated and/or handed off. The user's mobile communication device may notify the communication interface to terminate and/or hand off the communicative coupling, and/or the user's mobile communication device may terminate and/or recover the communicative coupling itself. The user's mobile communication device may be configured to determine the communication interface is out of range and/or out of communicative contact, to determine a cellular signal from another cellular base station is stronger than the signal from the communication interface, to determine a sound quality of the communicative coupling between the directional microphone and/or directional sound emitter and the remote entity's communication device is below a predetermined threshold, to receive a user indication that the communicative coupling should be terminated and/or handed off, and/or the like.

The communication interface may be configured to determine whether the user has rights to use the directional microphone and/or the directional sound emitter. The communication interface may determine whether the user has rights based on an identifier received from the user's mobile communication device; based on a previous coupling with the user's mobile communication device; based on whether the communication interface and the user's mobile communication device are paired; based on an identity of the user; based on facial recognition of the user performed by, e.g., the user-tracking sensor; based on vocal emissions from the user (e.g., based on voice recognition performed on the vocal emissions, based on a code phrase in the vocal emissions, etc.); based on a gesture, facial expression, and/or eye movement detected by, e.g., the user-tracking sensor; and/or the like.

The hands-free intercom may be configured to automatically connect a user to an appliance. The communication interface may be configured to communicatively couple the directional microphone and/or directional sound emitter to the appliance. The user may indicate to which appliance the communication interface should couple. For example, the user-tracking sensor may detect a user gesture, facial expression and/or eye movement indicating an appliance, the directional microphone may detect a vocal emission including a vocal identification of an appliance (e.g., a vocal identification preceded by vocalized keyword), and/or the like. The communication interface may communicatively couple the user to the appliance in response to the indication of which appliance.

The appliance may include a laundry washing machine, a laundry drying machine, a dish washing machine, a refrigerator, a freezer, a water heater, a thermostat, a furnace, an air conditioner, an oven, a range, a microwave oven, a coffee machine, a rice cooker, a bathtub, a shower, an alarm clock, a home control center, an outdoor sprinkler system, an electrical energy storage system, an electrical charging system, a security control system, a door lock, a room light, a window covering, a water softener, and/or the like. The appliance may include a television, a radio, a stereo, a projector, a DVD player, a video game console, a digital video recorder, a home theater system, a home entertainment system, and/or the like. The appliance may include a printer, a copy machine, a fax machine, a computer, a message center, an answering machine, and/or the like.

The directional microphone may receive vocal emissions from the user intended for the appliance. The vocal emissions may include a request to change a setting of the appliance. The vocal emissions may include a request for the appliance to start an activity, such as preheating an oven, washing a plurality of objects, drying a plurality of objects, changing a temperature of a room, turning on a television, playing a song, recording a television program, starting to fill a bathtub, locking a door, sending an email, printing a document, playing answering machine messages, and/or the like. The request may indicate the appliance should notify the user when the activity is completed (e.g., notify the user via the directional sound emitter). The request may indicate a time period for which the activity should be performed.

The vocal emissions from the user may include a request for a status of the appliance. The status may include a current activity being performed by the appliance, a time to complete an activity, a time to complete all activities, and/or the like. One appliance may request information from another appliance to determine the time to complete an activity and/or all activities. For example, the appliance may be a laundry washing machine, and the laundry washing machine may request a drying time from a laundry drying machine. Alternatively, or in addition, the appliance may be a water heater, and the water heater may request a room temperature from a thermostat. The information may be requested via the communication interface and/or directly from the other appliance.

The vocal emissions from the user may include a request to change settings of the appliance. The request may include a request to repeat an activity an additional time (e.g., repeating a wash cycle, a rinse cycle, a spin cycle, a drying cycle, etc.). The request may include a request to minimize a time to completion. The appliance may shorten one or more activities to complete task faster. The communication interface may automatically instruct the appliance to change settings, for example, based on an activity of the user (e.g., an activity determined by a user-tracking sensor), a location of the user, and/or the like. The communication interface may instruct a thermostat to change one or more room temperatures based on the location of the user, instruct a water heater to change water temperature based on a location of the user, instruct a dish and/or laundry washing and/or drying machine to target a particular completion time based on a location of the user, and/or the like. The vocal emissions from the user may include a request to stop an activity.

The appliance may be configured to report information to the user via the communication interface and/or the directional sound emitter. The user may respond to the reported information (e.g., vocally) by, inter alia, requesting a reminder after an indicated time, request a reminder when the user changes rooms, and/or the like. The reported information may include that an activity and/or task has been completed. The reported information may include that a consumable substance is low. The consumable substance may include soap, bleach, drying agent, static removing agent, fuel, salt, paper, ink, etc. The reported information may include a reminder of current settings, such as an indication that an oven is on, that a door is locked, etc. Alternatively, or in addition, the communication interface may determine the information to report to the user. The communication interface and/or directional sound emitter may deliver a notification of a change in activity, such as an indication a thermostat is changing a target temperature according to a predetermined schedule, an indication that a current appliance cycle has changed, and/or the like.

The communication interface and/or directional sound emitter may deliver a request for permission to change settings. The request may be from the communication interface, the appliance, another user, and/or the like. For example, the appliance and/or communication interface may determine that the settings should be changed based on a sensor measurement. The appliance and/or communication interface may determine that an additional activity is needed (e.g., an extra wash cycle, rinse cycle, spin cycle, drying cycle, extra drying time, etc.). The communication interface and/or directional sound emitter may indicate an additional time required to complete an activity and/or task if settings are changed, for example, by the user, the other user, the appliance, the communication interface, etc. The appliance, communication interface, and/or directional sound emitter may be configured to deliver a report of an error with the appliance. The vocal emissions from the user may include a user command to the appliance in response to the reported error. The appliance, communication interface, and/or directional sound emitter may deliver a request for permission to contact a maintenance provider. The user may respond (e.g., vocally) to indicate whether permission is granted or not.

The communication interface may be configured to determine whether the appliance is permitted to communicate with the user. The communication interface may evaluate user settings to determine whether the appliance is permitted to communicate with the user. The communication interface may determine whether the appliance is permitted to communicate with the user based on time of day, user location (e.g., a location determined by the user-tracking sensor), a user indication of availability, whether another person is with the user, an identity of the appliance, an identity of the user, and/or the like. The communication interface may determine that the user is accessible via a mobile user device and may determine whether the appliance is permitted to have communications forwarded to a mobile user device.

The communication interface may determine based on context whether the appliance is permitted to communicate with the user. The communication interface may determine whether the user requested the communication from the appliance, may determine historical user behavior in similar situations, and/or the like. The communication interface may determine whether the appliance is permitted to communicate with the user based on user activity (e.g., an activity determined by the user-tracking sensor). For example, the user-tracking sensor may determine whether the user is sleeping, and the communication interface may determine whether communication is permitted based on whether the user is sleeping. The user-tracking sensor may determine whether the appliance is permitted to communicate with the user based on a type of communication from the appliance. The communication interface may allow certain types of communications, such as urgent maintenance requests, notifications of activity and/or task complete, etc., despite other factors weighing against permitting communication. The communication interface may decide to notify the user of a detected and/or suspected leak despite the user sleeping, the time being 3:00 AM, and/or the like.

The communication interface may determine whether the user is permitted to communicate with the appliance. The communication interface may determine whether communication is permitted based on settings by a primary user, based on an identity of the user, based on whether the user instructed the appliance to begin its current activity, and/or the like. The communication interface may identify the user by performing voice recognition on vocal emissions received by the directional microphone and/or communication interface. The communication interface may determine whether communication is permitted based on security information provided by the user (e.g., a passcode, a password, a passphrase, a gesture, a facial expression, an eye movement, etc.). The communication interface may determine whether communication is permitted based on a location of the user. For example, a remotely located user may be prevented from communicated with the appliance, and/or only some users may be permitted to communicate with appliances while remotely located. The communication interface may determine whether communication is permitted based on a type of communication. Certain users may be able to request and receive status information but may be prevented from delivering commands, e.g., to perform an activity and/or task, change a setting, etc.

The communication interface may determine whether a first appliance is permitted to communicate with a second appliance. The communication interface may evaluate user settings to determine whether inter-appliance communication is permitted. The communication interface may determine whether is communication is permitted based on a type of communication. For example, appliances may be able to request and receive status information but may be prevented from delivering commands and/or prevented from making updates or changes to software and/or firmware. The communication interface may determine whether communication is permitted based on an identity of the first appliance and/or an identity of the second appliance. The communication interface may be configured to record and store copies of communications between the appliance and the user of the hands-free intercom; such recordings may include metadata, such as time of day, appliance settings, location and/or activity of the user, etc. The communication interface may record communications between appliances.

Various divisions of labor between the appliance and the communication interface are contemplated. In an embodiment, the communication interface may transmit all communications it receives to the appliance, and the appliance may determine access rights for the communications. The communication interface may be configured to convert vocal emissions (e.g., audio representations thereof) into messages understood by the appliance. Alternatively, or in addition, the communication interface may deliver vocal emissions (e.g., audio representations thereof) to the appliance, and the appliance may be configured to decipher the vocal emissions (e.g., audio representations thereof). The communication interface may be configured to convert messages from the appliance into an audible and/or user-interpretable form, and/or the appliance may be configured to deliver audible and/or user-interpretable messages to the communication interface. The appliance may be configured to receive and respond to communications from the communication interface. Alternatively, or in addition, the communication interface may directly retrieve information from and/or write information to a non-transitory computer readable storage medium of the appliance, and/or the communication interface may be configured to request and deliver information via an application programming interface (API) of the appliance.

The hands-free intercom may be configured to provide video-aided communication to the user. The hands-free intercom may include a directional camera configured to capture video of the user, and/or the communication interface may communicatively couple to a camera of another system to capture video of the user. The other system may be a computer system, a mobile communication device, a surveillance system (e.g., a system including a camera for news gathering, web viewing, traffic, etc.), a security system, and/or the like. The directional and/or other camera may be part of the user-tracking sensor. The hands-free intercom may include a directional video projector configured to deliver video to the user by projecting video into the user's eye(s) (e.g., by projecting video onto the user's retina(s)). The directional camera and/or the camera of the other system may be configured to capture stereoscopic video of the user, and/or the directional video projector may be configured to deliver video stereoscopic video to the user. The directional camera, the camera of the other system, and/or the directional video projector may be configured to track the user when the user moves. The directional microphone and/or sound emitter may be controlled based on the tracking of the user by the directional camera, the camera of the other system, and/or the directional video projector. Alternatively, or in addition, the directional sound emitter, directional camera, the camera of the other system, and/or the directional video projector may be controlled based on tracking by the directional microphone. The communication interface may be configured to provide a location of the user to a controller of one or more video cameras.

In some embodiments, there may be multiple directional cameras (e.g., as part of a plurality of interfaces of the hands-free intercom), and/or the communication interface may be communicatively coupled to a plurality of video cameras (e.g., of a plurality of other systems). The communication interface may be configured to select one or the plurality of cameras from which to receive video of the user based on a location and/or orientation of the user and/or based on an orientation, a location, a resolution, an imaging capability, an ownership, an availability, a price for supplied video, and/or the like for one or more of the cameras. The communication interface may be configured to deliver a request to capture video and/or a request for video already being captured to a controller of the video camera.

The communication interface may be configured to provide captured video from the directional camera and/or the camera of the other system to a remote entity. The communication interface may be configure to edit the captured video before providing it to the remote entity. Editing may include replacing the user with an avatar, blurring one or more features of the user, masking unclothed portions of the user, replacing the user with a silhouette, and/or the like. In an embodiment, the communication interface may receive a hand off of a communicative coupling with the remote entity from a mobile communication device, and the communication interface may provide video to the remote entity after the communicative coupling has been handed off.

The communication interface may be configured to identify a gesture from the user, facial expression of the user, and/or eye movement of the user based on the captured video. For example, the gesture, facial expression, and/or eye movement from the user may be a command for the hands-free intercom. The communication interface may use the captured video to assist in speech recognition of vocal commands from the user. The communication interface may be configured to instruct the directional camera and/or the camera of the other system to adjust a camera parameter (e.g., zoom, focus, illumination, pan, etc.), and/or the directional camera and/or the camera of the other system may be configured to automatically adjust a camera parameter (e.g., zoom, focus, illumination, pan, etc.). For example, the communication interface, directional camera, and/or camera of the other system may detect the presence of a face in the video and may adjust the zoom, focus, illumination, pan, etc. to locate the face in a predetermined location in the video.

Alternatively, or in addition, the directional camera, camera of the other system, and/or communication interface may instruct a remote light source to adjust illumination.

The directional video projector may be configured to deliver video of the remote entity, to deliver video including status information for the communicative coupling (e.g., an identity of the remote entity, a location of the remote entity, a time that the communicative coupling has been active, a quality of the communicative coupling, whether the communicative coupling is being recorded, whether an eavesdropper is present, etc.), to deliver video indicating one or more commands that can be delivered by the user, to deliver video indicating a command received from the user, to deliver video including status information from an appliance, and/or the like. The directional video projector may be configured to deliver video including status information about an incoming or outgoing communicative coupling before the incoming or outgoing communicative coupling is established. The directional video projector may be configured to project the video in the user's field of view at a location proximate to the camera capturing video of the user. For example, the directional video projector may project the video so the eyes of a person in the video are at a location proximate to the camera. Accordingly, it may appear to the remote entity like the user is making eye contact when the user looks at the eyes of the person in the video.

The communication interface may be configured to determine whether to provide the captured video to the remote entity based on one or more access rules. Alternatively, or in addition, the directional camera and/or the camera of the other system may be configured to determine whether to capture video based on one or more access rules. The access rules may include rules pertaining to an activity of the user, a location of the user, a clothing status of the user, an identity of the user, an identity of the remote entity, an identity of a person with the user, a capability of the remote entity, a time, a date, and/or the like. The communication interface may be configured to prompt the user about whether to capture video and/or provide the captured video to the remote entity. The directional camera may be configured to determine whether to capture video and/or the communication interface may be configured to determine whether to provide the captured video based on an indication received from the user (e.g., with or without prompting). The indication may include a vocal emission, a gesture, a facial expression, an eye movement, and/or the like. The directional camera may be configured to determine whether to capture video based on an operational state of the directional microphone and/or the directional sound emitter (e.g., whether or not they are turned on, whether they are currently communicating with the user, etc.).

The hands-free intercom may be configured to induce the user to move to a desired location. The hands-free intercom may use the directional sound emitter, a display (e.g., a monitor, a video projector, etc.), and/or the like to induce the user to move to the desired location. Alternatively, or in addition, the hands-free intercom may induce the user to remain within a connectivity boundary. The connectivity boundary may be a boundary where the directional microphone, the directional sound emitter, the communication interface, the directional camera, and/or the display loses connectivity with the user. The directional sound emitter and/or the display may also, or instead, induce the user to face in a desired orientation (e.g., an orientation facing a camera).

The desired location and/or the desired orientation may be a location and/or an orientation where performance of the hands-free intercom is best. The directional microphone may have a high sensitivity for the desired location and/or orientation; the camera may be able to produce high quality images of the desired location and/or orientation; the directional sound emitter may be able to deliver high quality sound to the desired location and/or orientation; the display may be able to deliver high quality video to the desired location and/or orientation; the communication interface may be able to receive strong signals from wireless devices at the desired location and/or orientation; and/or the like.

The directional sound emitter may induce the user to move to the desired location and/or face in the desired orientation by degrading sound quality, decreasing an audio bit rate, adding overlaid distortion, adding frequency distortion, decreasing sound volume, increasing sound volume (e.g., increasing the volume to an uncomfortable level), playing an unpleasant sound (e.g., a buzzing sound, a screeching sound, an audio feedback sound, etc.), playing a user selected sound, and/or the like. The directional sound emitter may provide the inducement when the user is outside the desired location, moving away from the desired location, near the connectivity boundary, facing away from the desired orientation, turning away from the desired orientation, etc. The amount of inducement may be determined based on a loss in quality of, for example, measured vocal emissions, captured video, and/or signal strength of a wireless device. The amount of inducement may be determined based on a distance of the user from the desired location. For example, the inducement may be maximized near the connectivity boundary.

The directional sound emitter may induce the user to move to the desired location and/or face in the desired orientation by causing the audio to appear as though it is coming from the desired location and/or orientation. The directional sound emitter may adjust the relative volume of the audio delivered to each ear, adjust the relative time delay of the audio delivered to each ear, and/or the like to cause the audio to appear as though it is coming from the desired location and/or orientation. The directional sound emitter may provide a vocal indication to the user to induce the user to move to the desired location and/or to face in the desired orientation. The vocal indication may indicate the desired location, that the user is outside the desired location, a time and/or distance until the user reaches the connectivity boundary (e.g., heading away from the desired location), the desired orientation, that the user is facing away from the desired orientation, etc. The vocal indication may indicate that the user is inside the desired location, a time and/or distance until the user reaches the connectivity boundary (e.g., heading toward the desired location), that the user is facing toward the desired orientation, etc. The directional sound emitter may provide one of a plurality of vocal emissions, and the vocal emission may be selected based on a distance of the user from the desired location.

The display may induce the user to move to the desired location and/or face in the desired orientation by adjusting video delivered to the user. The display may adjust the video by moving its position in the user's field of vision. The display may be configured to project the video into the eyes of the user and may induce the user to move and/or turn by adjusting the video projected into the user's eyes. The display may provide an indication of the desired location, the connectivity boundary, and/or the desired orientation to the user. A projective display may project light onto the floor so as to directly display the desired location, the connectivity boundary, and/or the desired orientation to the user. The indication may include text, one or more arrows, a map (e.g., an orthographic-view map, a scene-view map, etc.), and/or the like. The display may provide an indication of a time and/or distance until the user reaches the connectivity boundary (either heading toward the desired location or away from it). The display may display boundary lines for the desired location and/or the connectivity boundary. The display may provide an indication that the user is moving away from the desired location and/or turning away from the desired orientation. The display may provide an indication that the user is moving toward the desired location and/or turning toward the desired orientation.

The display may provide visual stimuli indicating the user is outside the desired location, moving towards and/or away from the desired location, facing away from the desired orientation, turning away from the desired orientation, and/or the like. The visual stimuli may include flashing. The frequency of the flashing may be increased as the user moves farther away from the desired location. The display may induce the user to move and/or turn by degrading video quality, decreasing the frame rate of the video, decreasing the number of pixels per frame, decreasing the frame size, decreasing the contrast, decreasing the brightness, increasing the brightness (e.g., to an uncomfortable level), and/or the like. The display may provide the inducement when the user is outside the desired location, moving away from the desired location, near the connectivity boundary, facing away from the desired orientation, turning away from the desired orientation, etc. The amount of inducement may be determined based on a loss in quality of, for example, measured vocal emissions, captured video, and/or signal strength of a wireless device. The amount of inducement may be determined based on a distance of the user from the desired location.

The hands-free intercom may occupy one or more houses, apartments, office buildings, warehouses, restaurants, stores, malls, outdoor facilities, transportation facilities, hospitals, and/or the like. The hands-free intercom may be located indoors and/or outdoors. The hands-free intercom may include a persistent storage device for automatically recording a conversation between the user and the entity of interest. Alternatively, or in addition, the persistent storage device may store a transcription of the conversation. The communication interface may automatically transmit the recording to the participants. The entity of interest and/or remote entity may include a person, an appliance, a computer system, and/or the like. The user may include a person, an appliance, a computer system, and/or the like.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or "Internet" or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as: general purpose computers; computer programming tools and techniques; computer networks and networking technologies; digital storage media; authentication; access control; and other security tools and techniques provided by public keys, encryption, firewalls, and/or other means.

FIG. 1 is a perspective view of a user 150 interacting with a hands-free intercom 100. The hands-free intercom 100 may include a user-tracking sensor 110, a directional microphone 120, and a directional sound emitter 130. The directional sound emitter 130 may include a plurality of ultrasonic speakers 131, 132. The user-tracking sensor 110 may determine the location of the user 150. In some embodiments, the user-tracking sensor 110 may also determine the identity of the user 150. The user-tracking sensor 110 may comprise one or more cameras, one or more microphones (which may include directional microphone 120), a radar sensor, an ultrasonic sonar sensor (which may include elements of directional sound emitter 130), or the like. The directional microphone 120 and directional sound emitter 130 may target the user 150 based on location information received from the user-tracking sensor 110. The directional microphone 120 may maximize reception of audio from the direction of the user 150 and/or the user's mouth while minimizing reception of audio from other directions. The directional microphone 120 may be steered mechanically and/or may include a phased array and/or metamaterial array to produce the directional reception.

The directional sound emitter 130 may emit ultrasonic sound waves from the plurality of ultrasonic speakers 131, 132. The plurality of ultrasonic speakers 131, 132 may be aimed so that the ultrasonic sound waves frequency convert to audible frequencies at or near the user's ears. For example, the ultrasonic sound waves may be modulated so as to produce audio of interest in the beat frequency created when the waves interfere. Alternatively, or in addition, the ultrasonic sound waves may be downshifted in the air and/or in a material in or on the user 150. The directional sound emitter 130 may be configured to maximize the volume of audible sound waves at or near the user 150 while minimizing the volume of audible sound waves in other locations. If the user 150 moves, the hands-free intercom 100 may reorient the directional microphone 120 and directional sound emitter 130 towards the user's new position. The directional sound emitter 130 or individual ultrasonic speakers 131, 132 may be steered mechanically and/or may include a phased array and/or metamaterial array to produce the directional emission.

Figure 2:
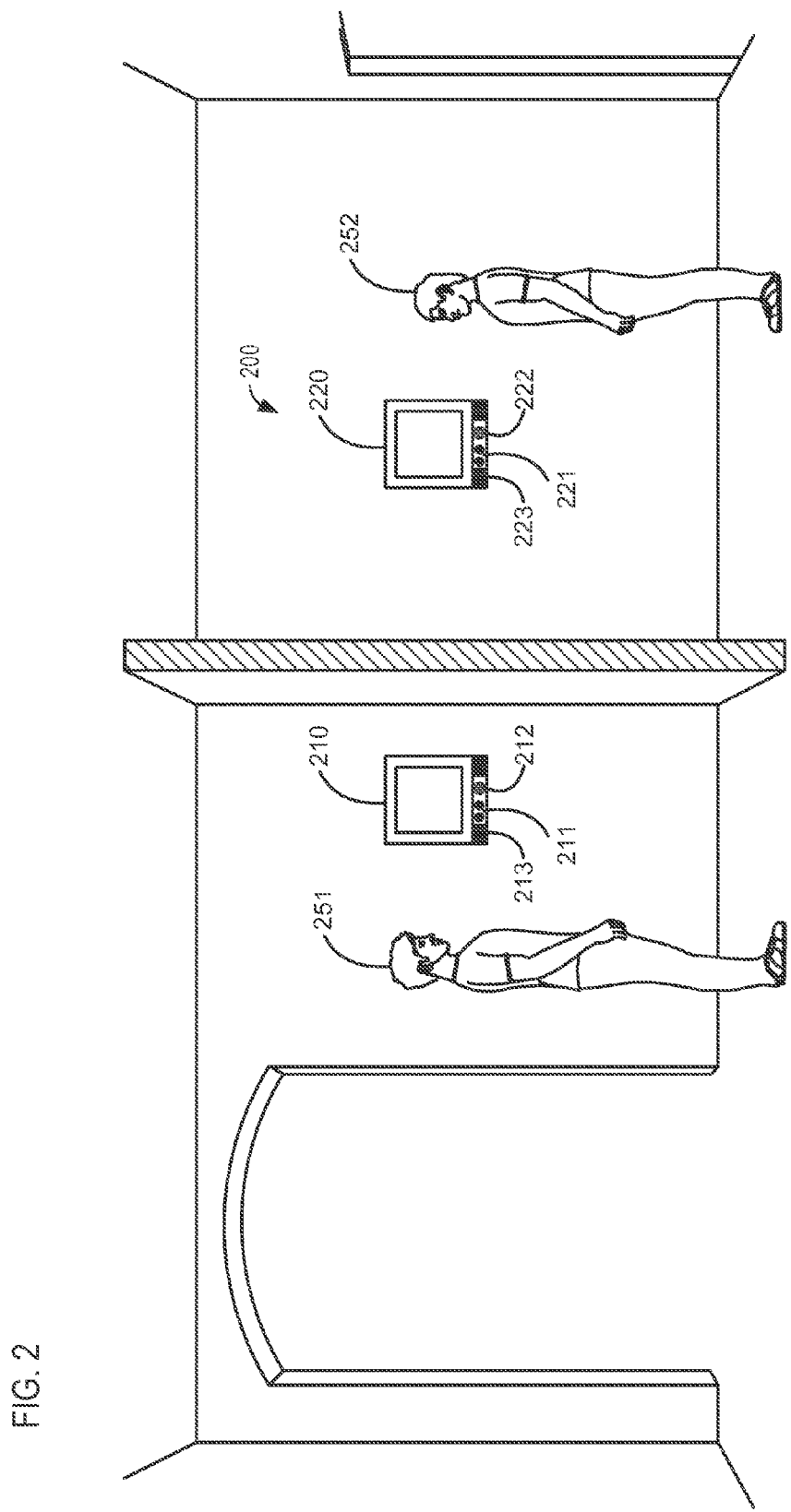
FIG. 2 is a perspective view of a pair of users communicating using a hands-free intercom.

FIG. 2 is a perspective view of a pair of users 251, 252 communicating using a hands-free intercom 200. A first user 251 may make a gesture, a facial expression, an eye movement, and/or vocal emissions that indicate he wishes to speak with the second user 252. A first user interface 210 including a first user-tracking sensor 211, a first directional microphone 212, and a first directional sound emitter 213 may detect the gesture, facial expression, eye movement, and/or vocal emissions. The hands-free intercom 200 may analyze the gesture, facial expression, eye movement, and/or vocal emissions to determine to whom the first user 251 is interested in speaking. For example, the first user 251 may say, "Have you heard back about your job interview?" and the hands-free intercom 200 may determine that the second user 252 had discussed a job interview with the first user 251 two days prior. Accordingly, the hands-free intercom 200 may decide to couple the first user 251 to the second user 252 and/or may prompt the first user 251 as to whether the second user 252 is the desired recipient.

Once the hands-free intercom 200 has determined that the first user 251 wishes to speak to the second user 252, the hands-free intercom 200 may locate the second user 252. The hands-free intercom 200 may locate the second user 252, for example, with user-tracking sensors 221 on one or more user interfaces 210, 220. The hands-free intercom 200 may then couple the directional microphone 222 and directional sound emitter 223 of the second user interface 220 to the directional microphone 212 and directional sound emitter 213 of the first user interface 210 so the users 251, 252 are able to communicate. There may be some delay while the hands-free intercom 200 analyzes the vocal emissions of the first user 251, identifies the second user 252, locates the second user 252, and communicatively couples the first user 251 to the second user 252. This delay may be hidden from the second user 252 (e.g., by delivering the vocal emissions offset by the delay), so the conversation appears to happen in real time. The first user 251 may be aware of the delay, so the hands-free intercom 200 may alert the first user 251 when the vocal emissions are delivered (e.g., by playing a ringing sound until the vocal emissions are delivered, by playing a tone once the vocal emissions are delivered, by playing the vocal emissions for the first user 251 as they are delivered to the second user 252, etc.). Remaining vocal emissions by the first and second users 251, 252 may be delivered in substantially real time (e.g., only delayed by any inherent delays in the hands-free intercom 200). The first user 251 and/or the second user 251 may be able to control the communicative coupling (e.g., pause, terminate, mute, etc.) using gestures, facial expressions, eye movements, vocal emissions, and/or the like.

Figure 3:
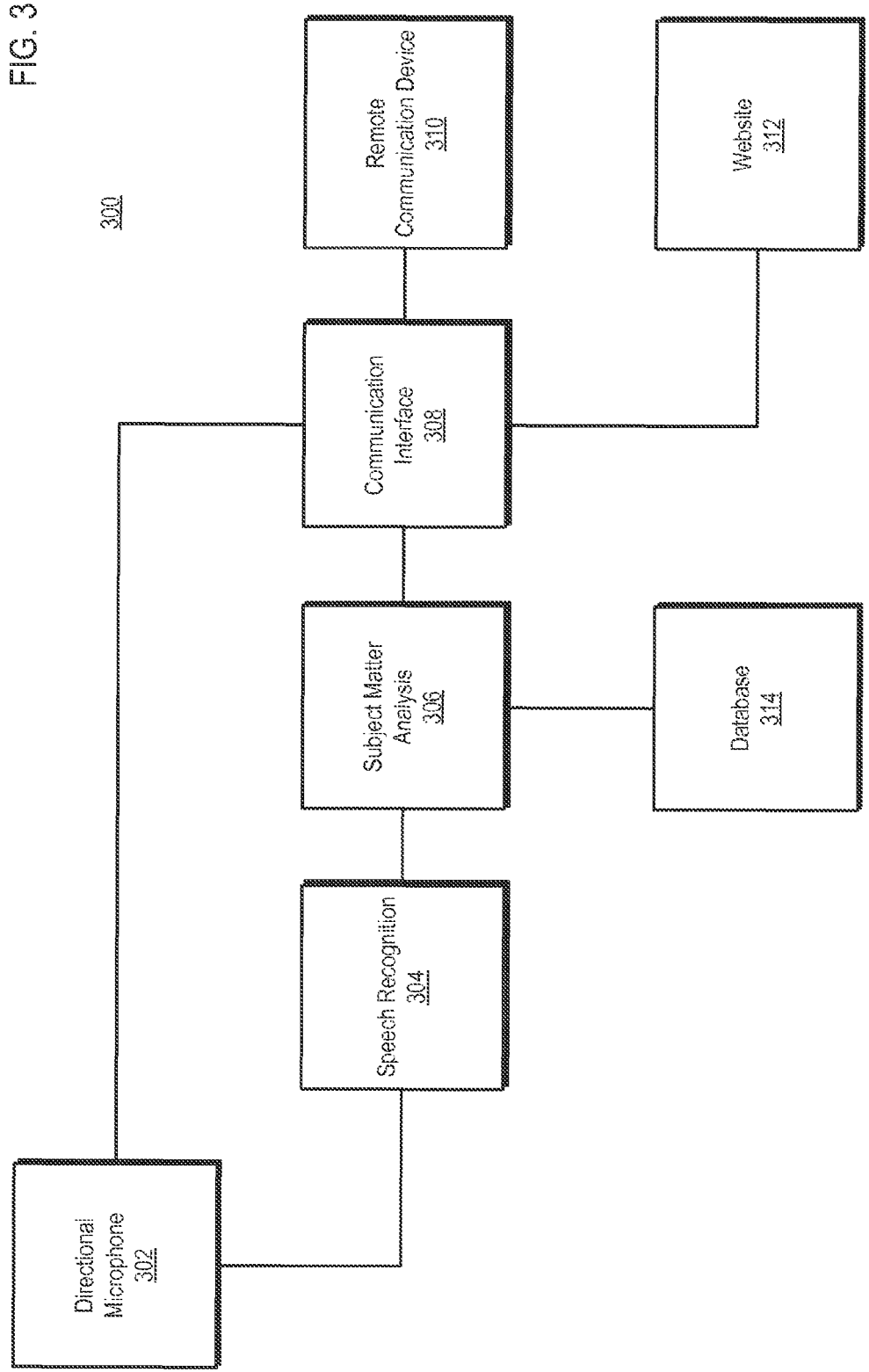
FIG. 3 is a block diagram of a system for analyzing vocal emissions to determine an entity of interest.

FIG. 3 is a block diagram of a system 300 for analyzing vocal emissions to determine an entity of interest. The system 300 may include a directional microphone 302 configured to receive vocal emissions from a user. The measured vocal emissions may be provided to a speech recognition block 304, which may convert the vocal emissions into a form recognizable by the computer (e.g., text, etc.). The results from the speech recognition block 304 may be provided to a subject matter analysis block 306. The subject matter analysis block 306 may determine a subject matter of the vocal emissions. For example, the subject matter analysis block 306 may be coupled to an internal and/or external database 314, which may contain keywords associated with users, subject matters of one or more previous conversations, and/or the like. Alternatively, or in addition, the subject matter analysis block 306 may be coupled to a website 312, such as a social media site, by a communication interface 308. The subject matter analysis block 308 may use one or more language analysis algorithms in combination with data from the database 314 and/or website 312 to identify the entity of interest. The subject matter analysis block 306 may indicate the identified entity of interest to the communication interface 308. The communication interface 308 may be configured to determine a remote communication device 310 of the entity of interest. The communication interface 308 may couple the user to the remote communication device 310 determined.

Figure 4:
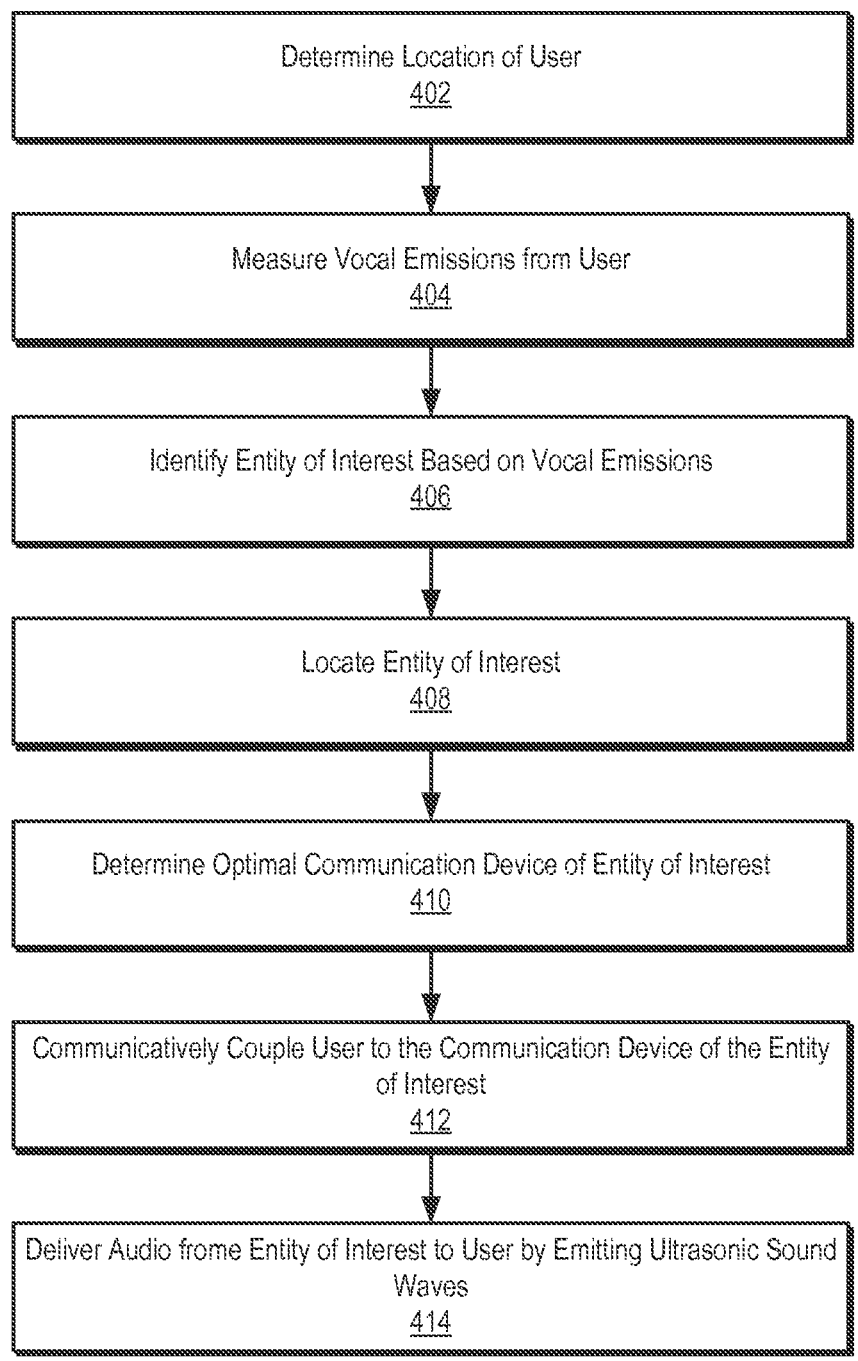
FIG. 4 is a flow diagram of a method for a user of a hands-free intercom to communicatively couple to an entity of interest.

FIG. 4 is a flow diagram of a method 400 for a user of a hands-free intercom to communicatively couple to an entity of interest. The method 400 may begin when a user comes within range of the hands-free intercom. The hands-free intercom may determine 402 a location of the user. The hands-free intercom may orient a directional microphone and a directional sound emitter towards the determined location.

The hands-free intercom may measure 404 vocal emissions from the user if the user says something. Based on the vocal emissions, the hands-free intercom may identify 406 the entity of interest to whom the user wishes to speak. The hands-free intercom may also be configured to determine from the vocal emissions if the user is not interested in using the hands-free intercom. In which case, the hands-free intercom may continue to measure 404 vocal emissions until it determines that the user is interested in communicating to an entity of interest using the hands-free intercom.

Once an entity of interest has been identified, the entity of interest may be located 408 by the hands-free intercom. In some embodiments, the hands-free intercom may prelocate potential entities of interest (e.g., the user's family members, the last five entities he's communicated with, entities identified by his calendar or schedule, etc.) so that the specific entity of interest may be rapidly connected to once identified by the user. The hands-free intercom may locate 408 the entity of interest using a user-tracking sensor, based on a cell phone of the user, based on a beacon, and/or the like. The hands-free intercom may determine 410 an optimal communication device of the entity of interest based on the location of the entity of interest. The hands-free intercom may communicatively couple 412 the user to the optimal communication device of the entity of interest determined in step 410. During communicative coupling, the hands-free intercom may deliver 414 audio received from the entity of interest to the user emitting ultrasonic sound waves to the user. When the communicative coupling is terminated, the method may end.

Figure 5:
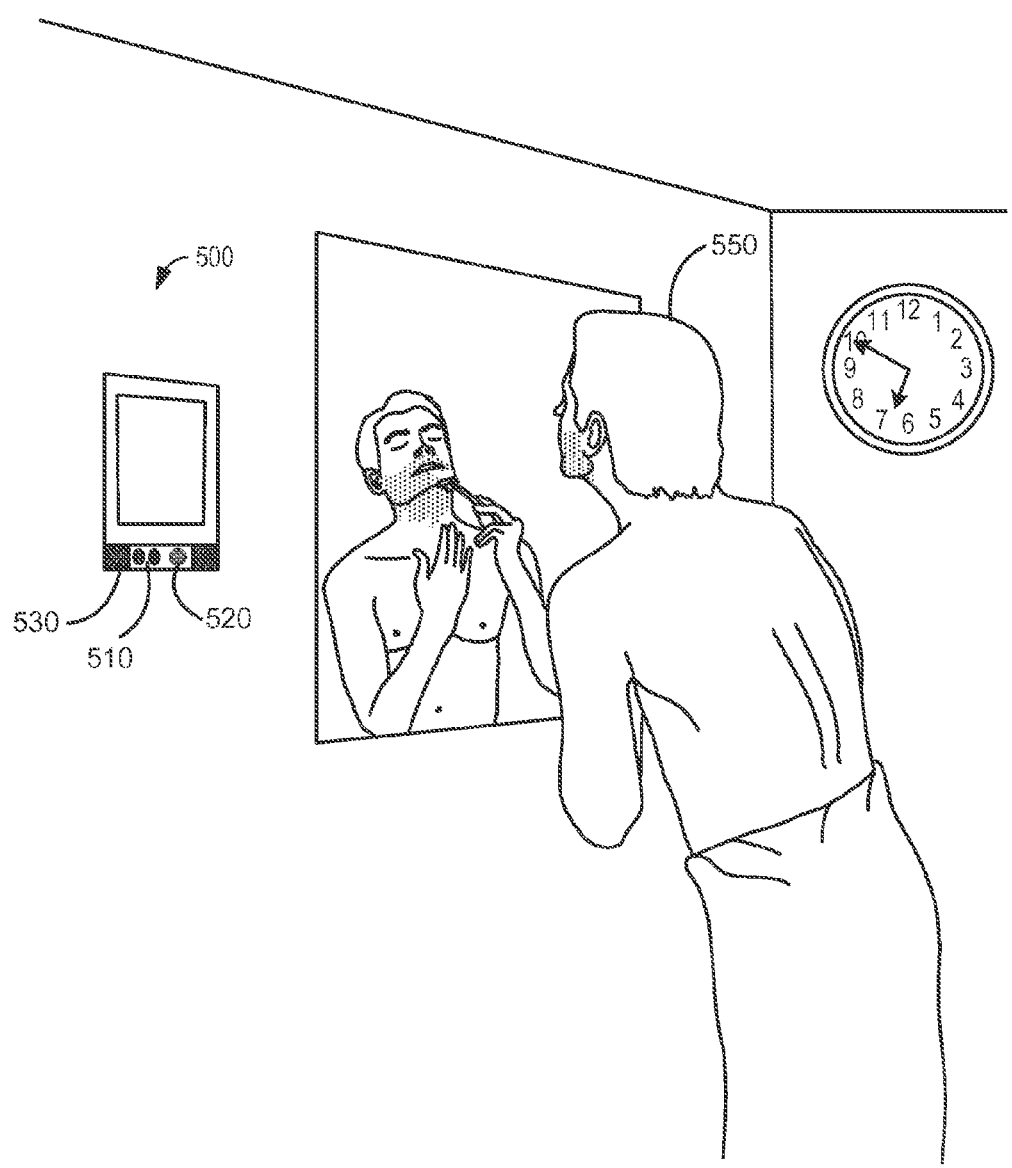
FIG. 5 is a perspective view of a hands-free intercom configured to apply access rules when determining whether to couple a remote entity to a user.

FIG. 5 is a perspective view of a hands-free intercom 500 configured to apply access rules when determining whether to couple a remote entity to a user 550. The hands-free intercom 500 may include a user-tracking sensor 510, a microphone 520, and a directional sound emitter 530. The hands-free intercom 500 may be configured to determine whether to couple a remote entity to the user based on a time, a day, a location of the user 550, an activity of the user 550, an identity of the remote entity, and/or the like. For example, the user 550 may be in a bathroom prior to 7:00 AM, so the hands-free intercom 500 may determine that a remote entity should not be communicatively coupled to the user 550. Alternatively, or in addition, the hands-free intercom 500 may determine that the user 550 is shaving, so the remote entity may not be coupled until the user 550 has finished shaving. The hands-free intercom 500 may allow an immediate family member to contact the user 500 despite the fact the user 550 is shaving but may prevent other remote entities from contacting the user.

The user 550 may be able to provide verbal instructions to the hands-free intercom 500 requesting privacy. The user 550 may be able to specify a predetermined time for the privacy, criteria for ending the privacy period, who or what subject matters may be allowed to couple despite the privacy request, and/or the like. The access rules and/or privacy request may specify entities and/or subject matters that should be rejected outright, entities and/or subject matters that should result in the user being prompted to connect, and entities and/or subject matters that should be automatically connected without prompting. In an embodiment, the hands-free intercom 500 may notify the user 550 of any attempted connections once the access rules no longer prohibit coupling and/or any period of requested privacy has ended. Alternatively, or in addition, the remote entity may record a message, be instructed to call back, and/or the like.

Figure 6:
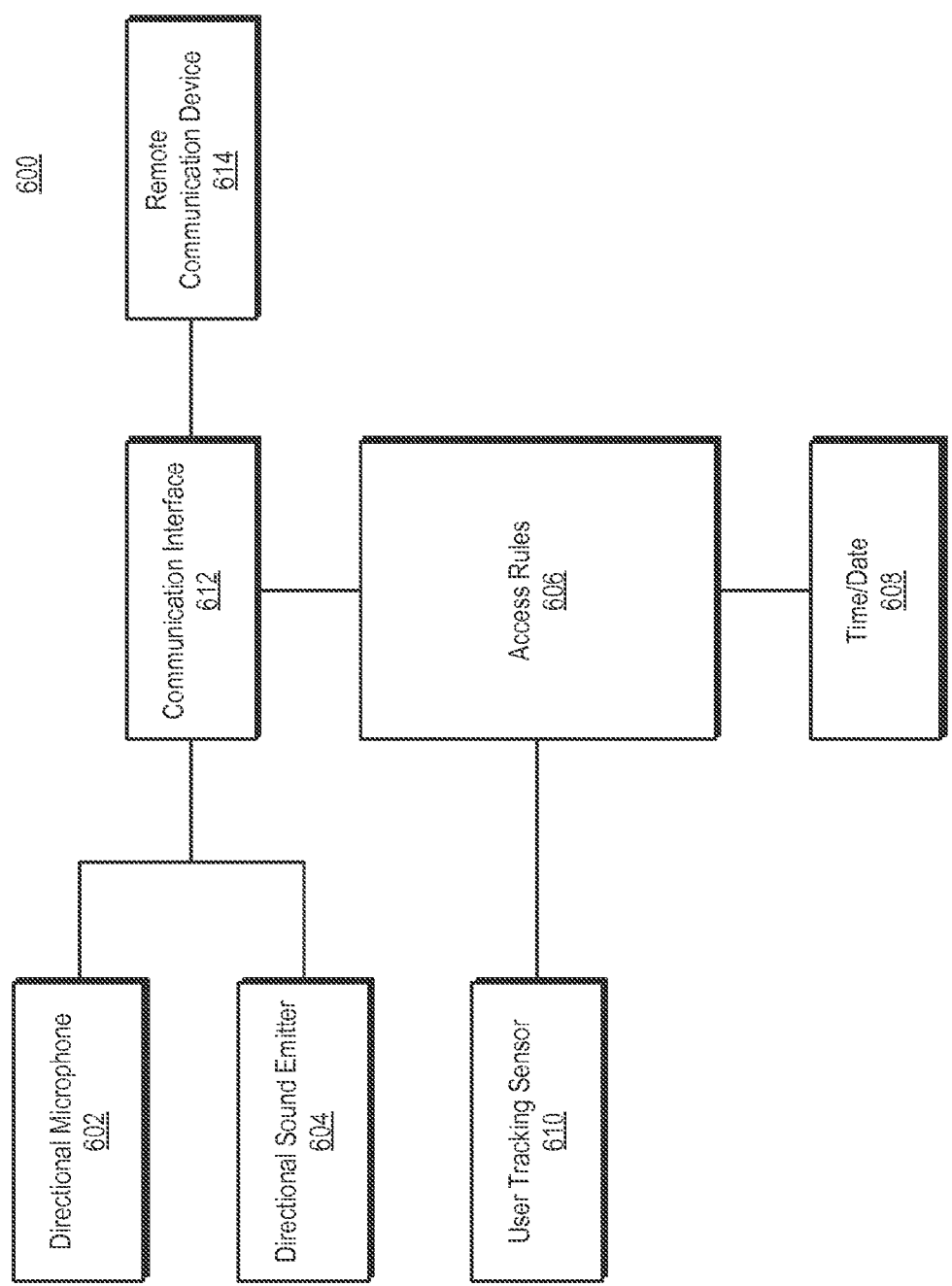
FIG. 6 is a block diagram of a system for determining whether to couple a remote entity according to access rules.

FIG. 6 is a block diagram of a system 600 for determining whether to couple a remote entity according to access rules. A communication interface 612 may be configured to receive a request from a remote communication device 614 to couple to a user. The communication interface 612 may be able to determine from the remote communication device 614 an identity of the remote entity and/or an intended subject matter for the coupling. For example, the communication interface 612 may prompt the communication device 614/remote entity for the subject matter; the communication device 614 may have determined the subject matter from vocal emissions from the remote entity and/or provided the vocal emissions to the communication interface 612; and/or the like.

The communication interface 612 may inform an access rules block 606 of the request to couple. The access rules block 606 may analyze the identity and/or subject matter of the request to determine whether to couple. The access rules block 606 may be coupled to one or more user-tracking sensors 610, which may be used to determine which room the user is occupying and/or an activity of the user. Based on the room and/or activity, the access rules block 606 may determine whether to couple the remote entity to the user. The access rules block 606 may be further coupled to a time/date block 608 configured to provide the time, date, day of the week, a user calendar, and/or the like to the access rules block 606 for use in determining whether to couple. The time/date block 608 may be an internal clock, an external time source, a calendar program operating on a user device, and/or the like.

The access rules block 606 may use any combination of data available to it to determine whether to couple the remote entity. The access rules block 606 may use default rules, user-specified rules, rules learned from past user behavior, and/or the like when analyzing the available data to determine whether to couple the remote entity to the user. The communication interface 612 may communicatively couple a directional microphone 602 and a directional sound emitter 604 to the remote communication device 614 if the access rules block 606 determines that coupling should be allowed.

Figure 7:
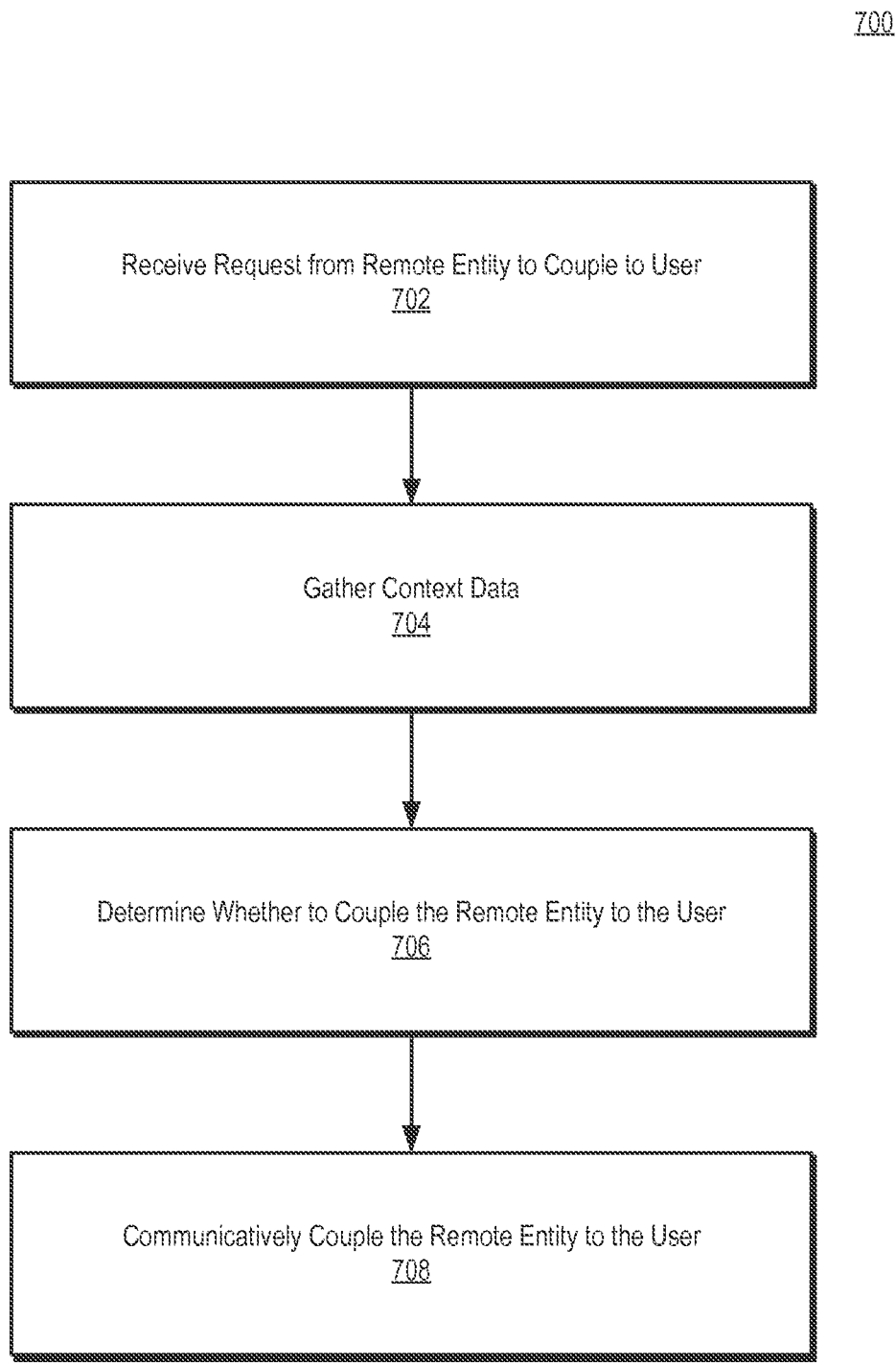
FIG. 7 is a flow diagram of a method for determining whether to couple a remote entity to a user.

FIG. 7 is a flow diagram of a method 700 for determining whether to couple a remote entity to a user. The method 700 may begin when a request is received 702 from a remote entity desiring to communicatively couple with the user. In response to receiving 702 the request, context data may be gathered 704. The context data may include the identity of the remote entity, a subject matter for the communicative coupling, a time, a day of the week, a user activity, a room being occupied by the user, an activity scheduled on a user calendar, and/or the like. The hands-free intercom may decide based on the access rules what context data should be gathered 704, and unnecessary context data may not be gathered. Gathering 704 context data may include periodically acquiring the context data and loading the previously acquired context data when a request is received 702.

Based on the context data, the hands-free intercom may determine 706 whether to couple the remote entity to the user. In an embodiment, access rules may be used to determine 706 whether to couple the remote entity to the user. The access rules may include a user-specified and/or default set of conditions contingent on elements of the context data. Alternatively, or in addition, the hands-free intercom may compare the context data to user behavior when previous requests were received to determine 706 whether to couple the remote entity to the user. The hands-free intercom may communicatively couple 708 the remote entity to the user if it determines that coupling should be performed. The method may end until another request is received.

Figure 8:
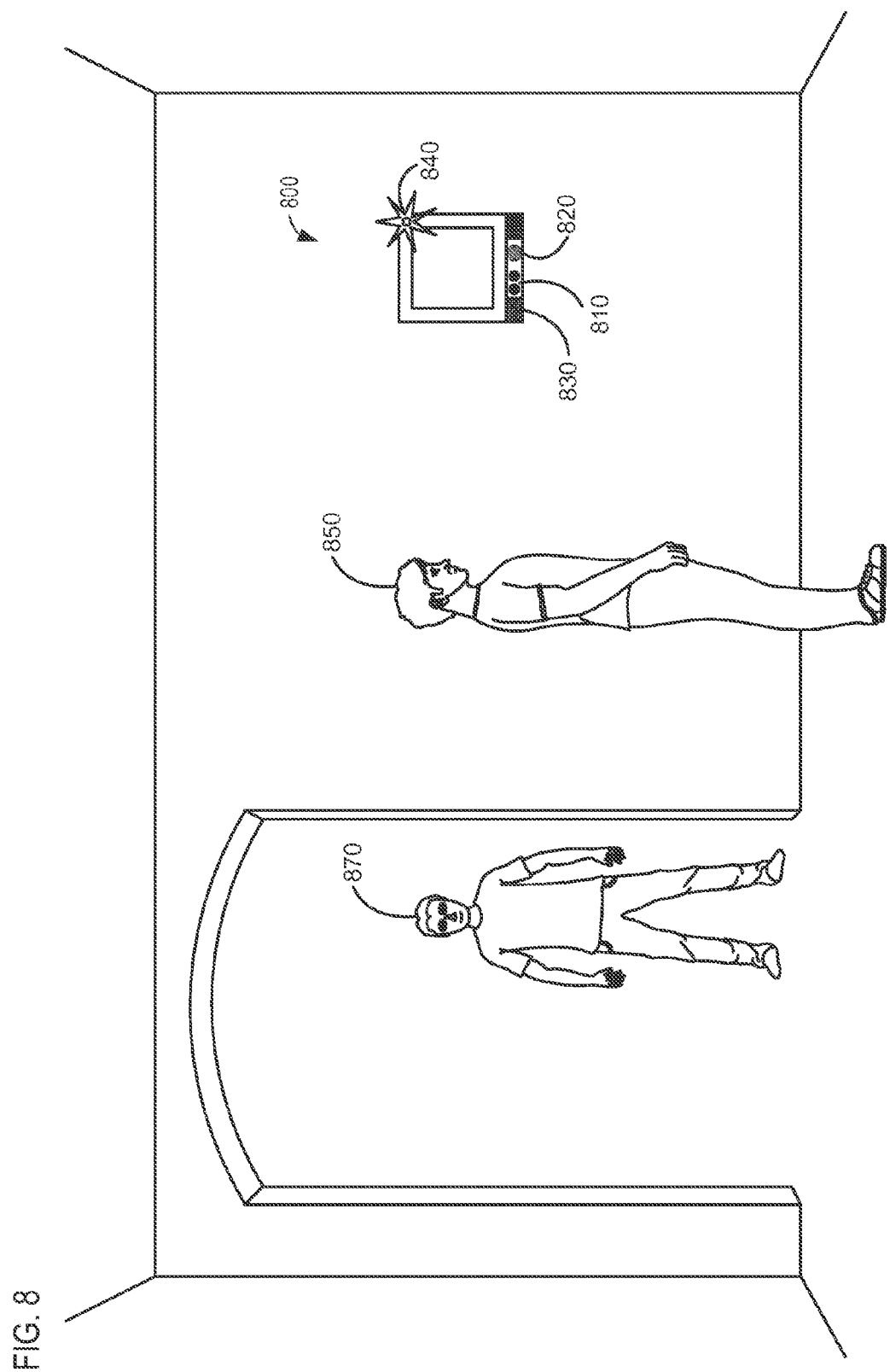
FIG. 8 is a perspective view of a hands-free intercom configured to warn a user about an eavesdropper.

FIG. 8 is a perspective view of a hands-free intercom 800 configured to warn a user 850 about an eavesdropper 870. The hands-free intercom 800 may include a user-tracking sensor 810, a directional microphone 820, a directional sound emitter 830, and an eavesdropper warning light 840. The user 850 may wish to keep some conversations private from eavesdroppers. Accordingly, the hands-free intercom 800 may monitor for eavesdroppers and alert the user 850 when an eavesdropper 870 is detected.

The hands-free intercom 800 may use the user-tracking sensor 810 and/or user-tracking sensors from additional interfaces (not shown) to detect the presence of the eavesdropper 870. Alternatively, or in addition, the user-tracking sensor 810 may detect the presence of the eavesdropper 870 based on the location of a mobile communication device of the eavesdropper 870, by tracking passage of the eavesdropper 870 through one or more doorways, and/or the like. The hands-free intercom 800 may warn of an eavesdropper 870 in a room other than that of the user 850 if it determines that the eavesdropper 870 is still within a listening range. Accordingly, the hands-free intercom 800 may be configured to sense the presence of the eavesdropper 870 in rooms other than the room occupied by the user 850 (e.g., using user-tracking sensors, doorway sensors, sensing of mobile communication devices, etc.).

The hands-free intercom 800 may warn the user 850 of the eavesdropper 870 using the eavesdropper warning light 840. Alternatively, or in addition, the hands-free intercom 800 may produce an audio indication that the eavesdropper 870 is present. The audio indication may be a noise, a tone, speech (e.g., computer-synthesized speech), and/or the like. The directional sound emitter 830 may emit the audio indication so it is only audible by the user 850. In an embodiment, the hands-free intercom 800 may refuse to complete a communicative coupling and/or may pause or terminate a communicative coupling when an eavesdropper 870 is detected. The refusal to complete the communicative coupling may be in addition to or instead of the warning to the user 850.

Figure 9:
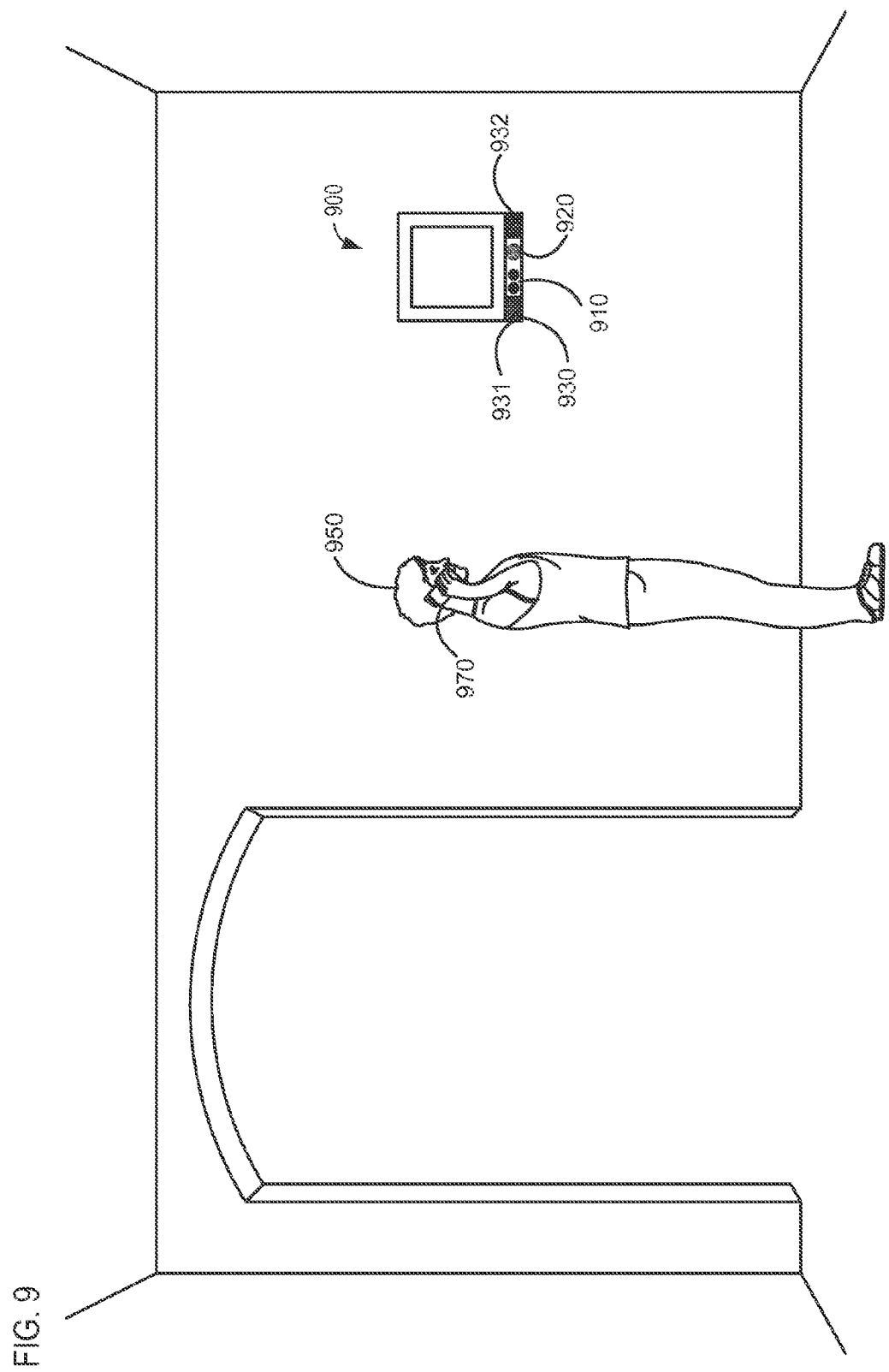
FIG. 9 is a perspective view of a hands-free intercom configured to automatically receive call handoffs from mobile communication devices.

FIG. 9 is a perspective view of a hands-free intercom 900 configured to automatically receive call handoffs from mobile communication devices. The hands-free intercom 900 may include a user-tracking sensor 910, a directional microphone 920, and a directional sound emitter 930. The directional sound emitter 930 may include a plurality of ultrasonic speakers 931, 932. A user 950 may be communicating with a remote entity (not shown) using a mobile phone 970. For example, the mobile phone 970 may be wirelessly coupled to a cellular base station, which may communicatively couple the mobile phone 970 to the remote entity's communication device.

It may be more convenient and/or more comfortable for the user 950 to communicate with the remote entity via the hands-free intercom 900. However, the user 950 may have initiated the call with the remote entity using the mobile phone 970, for example, because the user 950 was initially out of range of the hands-free intercom 900. The hands-free intercom 900 may detect that the user 950 is within range of the hands-free intercom 900 and/or may detect that the user 950 is coupled to the remote entity. For example, the user 950 may be within range if audible emissions from the user 950 can be detected by the directional microphone 920, if audio can be delivered to the user by the directional sound emitter 930, if the hands-free intercom 900 can wirelessly communicate with the mobile phone 970, and/or the like. The hands-free intercom 900 may detect the user 950 is coupled to the remote entity by detecting a position of the mobile phone 970 (e.g., near the user's ear, near the user's mouth, etc.) with the user-tracking sensor 910, by receiving vocal emissions (e.g., when no other person is present) using the directional microphone, by communicating with the mobile phone 970, and/or the like.

The mobile phone 970 may hand off the communicative coupling with the remote entity to the hands-free intercom 900. The mobile phone 970 may act as an intermediary that communicatively couples the hands-free intercom 900 to the remote entity, and/or the hands-free intercom 900 may communicatively couple to the remote entity without assistance from the mobile phone 970 after the hand-off is completed. In an embodiment, the hands-free intercom 900 may act like a peripheral device coupled to the mobile phone 970 by, for example, a Bluetooth protocol. In another embodiment, the hands-free intercom 900 may request the hand-off from a service provider. Alternatively, or in addition, the hands-free intercom 900 may act as a base station, such as a cellular base station, a Voice over Internet Protocol (VOIP) base station, etc., for the mobile phone 970 in order to perform a gradual hand-off.

The hands-free intercom 900 may transition from the directional microphone 920 and directional sound emitter 930 to other directional microphones and directional sound emitters (not shown) as the user 950 moves from one room to another. The communicative coupling may be returned to the mobile phone 970 if the user 950 leaves the range of the hands-free intercom 900. While the hands-free intercom 900 remains coupled to the remote entity, the hands-free intercom 900 may provide some or all of its functionality to the user 950, such as adding and/or removing parties, recording conversation, storing keywords, terminating the communicative coupling, etc., and may respond to user commands (e.g., gestures, facial expressions, eye movements, voice commands, etc.).

Figure 10:
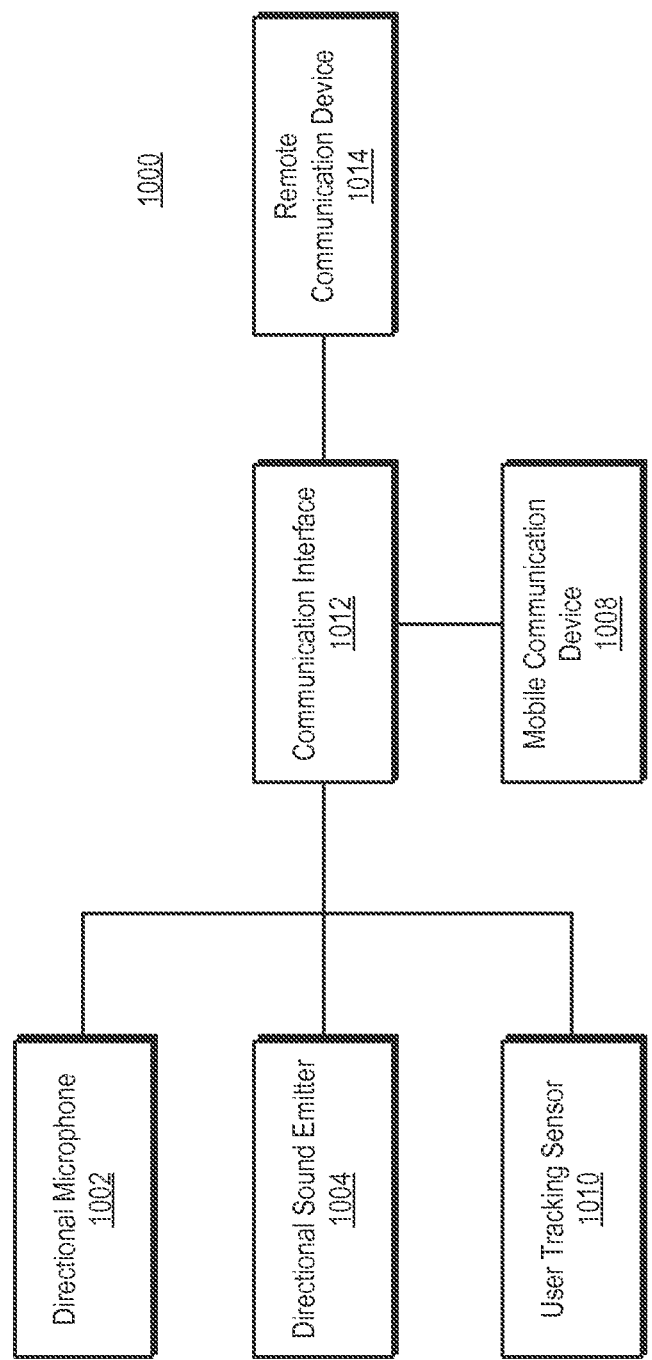
FIG. 10 is a block diagram of a system for automatically receiving call handoffs from mobile communication devices.

FIG. 10 is a block diagram of a system 1000 for automatically receiving call handoffs from mobile communication devices. The system 1000 may include a communication interface 1012, which may be communicatively coupled to a user-tracking sensor 1010. The communication interface 1012 and/or the user-tracking sensor 1010 may determine that a mobile communication device 1008 of a user is communicatively coupled to a remote communication device 1014 of a remote entity. The communication interface 1012 may be configured to communicatively couple a directional microphone 1002 and a directional sound emitter 1004 to the remote communication device 1014. Thus, the user may communicate with the remote entity without having to continue to hold or use the mobile communication device 1008, which may free their hands for other tasks, save on service charges, and/or the like.

In the illustrated embodiment, the communication interface 1012 couples the directional microphone 1002 and directional sound emitter 1004 to the remote communication device 1014 without sending communications to the mobile communication device 1008. For example, the communication interface 1012 may use plain old telephone service (POTS), the Internet, a mobile telephone service provider, and/or the like to communicate with the remote communication device 1014. The communication interface 1012 may be communicatively coupled with the mobile communication device 1008 to coordinate handing off of the communicative coupling. For example, the communication interface 1012 may inform the mobile communication device 1008 when it is available to receive communicative couplings, when a communicative coupling has been received, when a communicative coupling is being returned, etc. Similarly, the mobile communication device 1008 may inform the communication interface 1012 when it is coupled to a remote entity, when it handing off a communicative coupling, when it has received a returned communicative coupling, etc.

Figure 11:
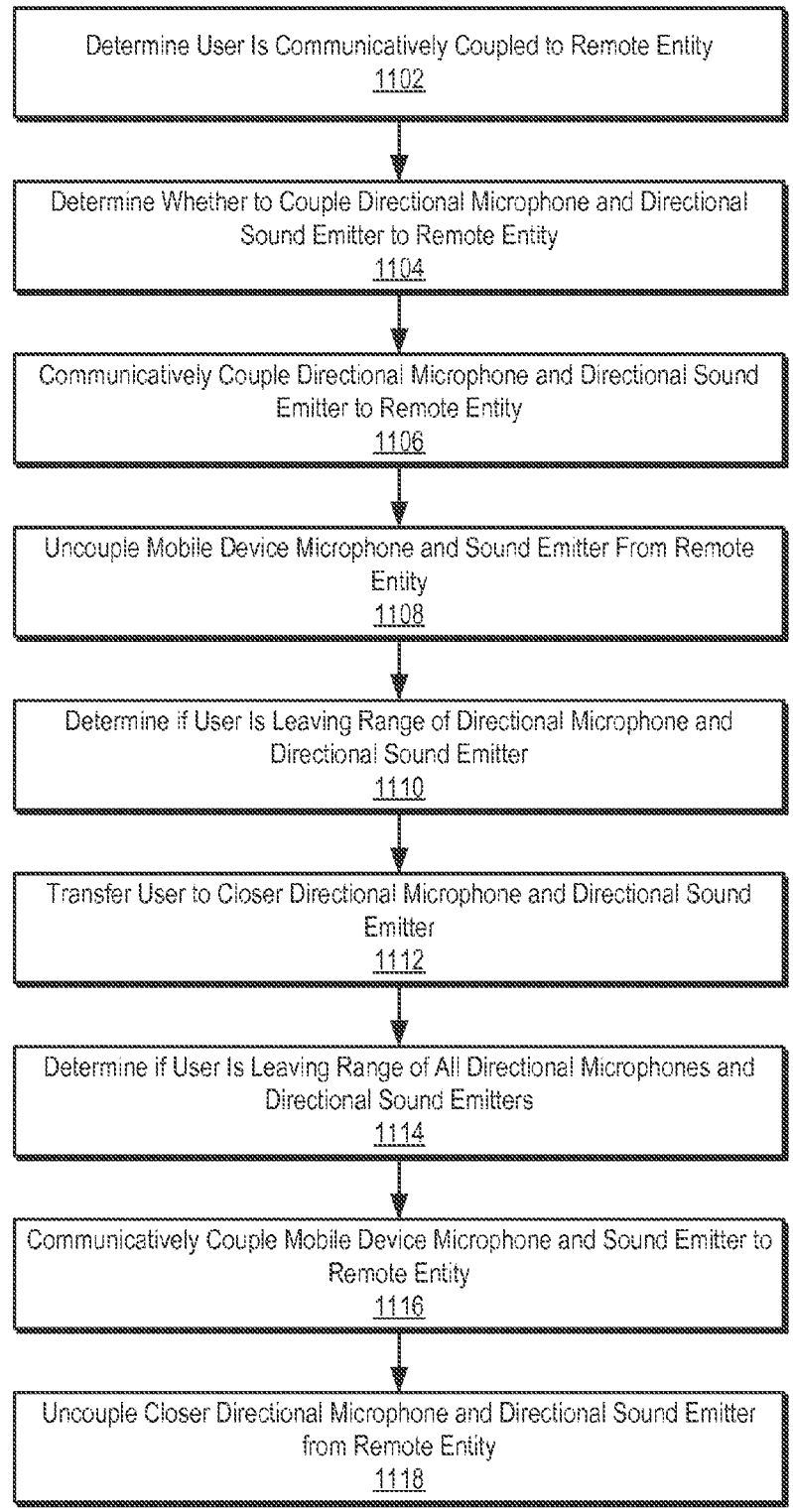
FIG. 11 is a flow diagram of a method for receiving a handoff of a communicative coupling from a mobile device.

FIG. 11 is a flow diagram of a method 1100 for receiving a handoff of a communicative coupling from a mobile device. The method 1100 may begin by determining 1102 a user is communicatively coupled to a remote entity. Whether a user is interacting with the mobile device and/or whether the mobile device is communicatively coupled to the remote entity may be continuously monitored. It may be determined 1104 whether a directional microphone and/or directional sound emitter should be coupled to the remote entity. For example, the user may indicate with a user gesture, facial expression, eye movement, or vocal emission that the directional microphone and/or directional sound emitter should be coupled to the remote entity, and/or the mobile device may indicate that the directional microphone and/or directional sound emitter should be coupled to the remote entity.

The directional microphone and/or directional sound emitter may be communicatively coupled 1106 to the remote entity, if it is determined 1104 that they should be. For example, the directional microphone and/or directional sound emitter may be communicatively coupled to the mobile device, which may remain coupled to the remote entity. In an embodiment, a request to communicatively couple may be sent to a service provider, which may transfer the communicative coupling with the remote entity from the mobile device to the directional microphone and/or directional sound emitter. Alternatively, or in addition, a communicative coupling may be established with the remote entity, and the communicative coupling may be distinct and/or separate from the communicative coupling between the remote entity and the mobile device. Before, during, or after communicatively coupling 1106 to the remote entity, a mobile device microphone and/or mobile device sound emitter may be uncoupled 1108 from the remote entity. The mobile device microphone and/or mobile device sound emitter may be disabled; the mobile device may be uncoupled from the remote entity; and/or the like.

The user may then communicate hands-free with the remote entity using the directional microphone and/or directional sound emitter. The user may move around while communicating via the directional microphone and directional sound emitter. At some point, it may be determined 1110 that the user is leaving the range of the directional microphone and/or directional sound emitter (e.g., the user has gone into a different room). A user-tracking sensor, the quality of audio received by the directional microphone, a location of the mobile device, and/or the like may be used to determine 1110 that the user is leaving the range of the directional microphone and/or directional sound emitter. If a directional microphone and/or directional sound emitter closer to the user is available, the user may be transferred 1112 to the closer directional microphone and/or directional sound emitter. The closer directional microphone and/or directional sound emitter may be determined based on a direction being travelled by the user, a location of a mobile device, detection of the user by the closer directional microphone and/or directional sound emitter and/or a user-tracking sensor associated with the closer directional microphone and/or directional sound emitter, and/or the like.

The user may leave the range of every directional microphone and/or directional sound emitter (e.g., by leaving a building and/or an area containing the directional microphones and/or directional sound emitters). Accordingly, it may be determined 1114 if the user is leaving the range of all directional microphones and/or directional sound emitters. For example, the user-tracking sensor, the audio quality detected by the closer directional microphone, the location of the mobile device, and/or the like may be used to determine 1114 that the user is leaving the range of all directional microphones and/or directional sound emitters. A warning may be sent to the user if the user is leaving the range. The mobile device microphone and/or sound emitter may be communicatively coupled 1116 if the user is leaving the range. In an embodiment, step 1116 may include doing the reverse of one or more of the actions taken in step 1108. The closer directional microphone and/or directional sound emitter may be uncoupled 1118 from the remote entity. Step 1118 may include doing the reverse of one or more of the actions taken in step 1106. Once the communicative coupling has been returned to the mobile device and/or terminated, the method 1100 may end.

Figure 12:
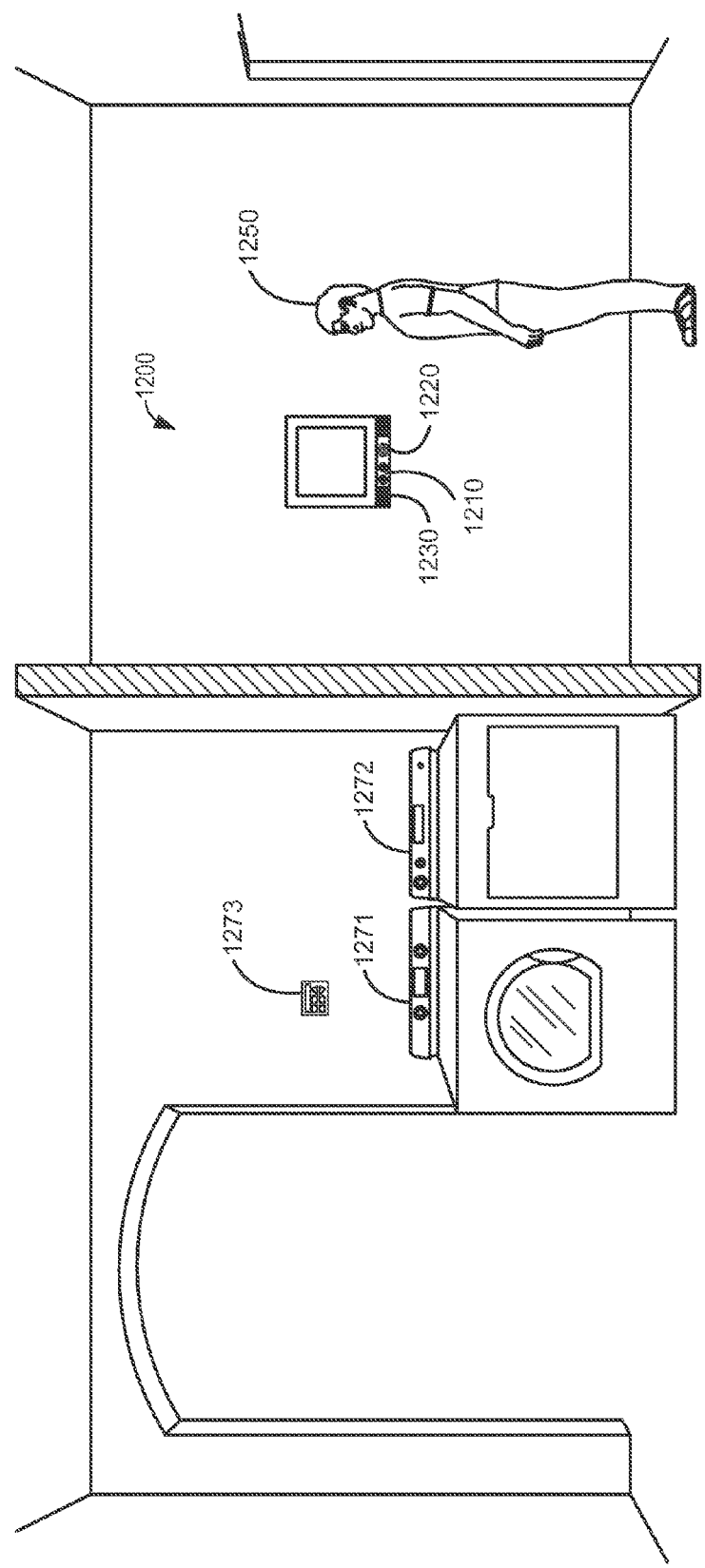
FIG. 12 is a perspective view of a hands-free intercom configured to automatically communicatively couple a user with one or more appliances.

FIG. 12 is a perspective view of a hands-free intercom 1200 configured to automatically communicatively couple a user 1250 with one or more appliances 1271, 1272, 1273. The hands-free intercom 1200 may include a user-tracking sensor 1210, a directional microphone 1220, and a directional sound emitter 1230. The hands-free intercom 1200 may be able to communicatively couple to the one or more appliances 1271, 1272, 1273. For example, the appliances 1271, 1272, 1273 may be "smart" devices able to send and receive communications.

The hands-free intercom 1200 may allow the user 1250 to communicate with the appliances 1271, 1272, 1273 using the directional microphone 1220, the directional sound emitter 1230, and/or a mobile device (not shown). The user 1250 may request a status, change settings, request that an activity be commenced, and/or the like. The hands-free intercom 1200 may also, or instead, allow the appliances 1271, 1272, 1273 to communicate with the user 1250, e.g., via the directional microphone 1220, directional sound emitter 1230, and/or mobile device. The appliance 1271, 1272, 1273 may report changes in activity, status updates, and/or the like. In some embodiments, the hands-free intercom 1200 may communicatively couple the appliances 1271, 1272, 1273 to each other. For example, a clothes washing machine 1271 may communicate with a clothes drying machine 1272 to determine how long it will take for clothes to be washed and dried and/or to attempt to align completion times. Similarly, the clothes drying machine 1272 may communicate with a thermostat 1273 and adjust setting based on an ambient temperature and/or humidity.

The hands-free intercom 1200 may manage which entities have rights to communicate with each other. The user-tracking sensor 1210 may be configured to identify the user 1250 and/or determine whether the user 1250 provides a gesture, facial expression, eye movement, or vocal command required for access. The hands-free intercom 1200 may determine which communications from the appliances 1271, 1272, 1273 should be forwarded to a mobile device and/or may prevent unauthorized mobile devices and/or remote users from accessing the appliances 1271, 1272, 1273. Users may have different rights, for example, depending on identity, location, and/or the like. Similarly, the appliances 1271, 1272, 1273 may have various rights for accessing the user 1250, as well as having various rights for accessing one another. The hands-free intercom 1200 may authenticate entities to determine what rights they have.

Figure 13:
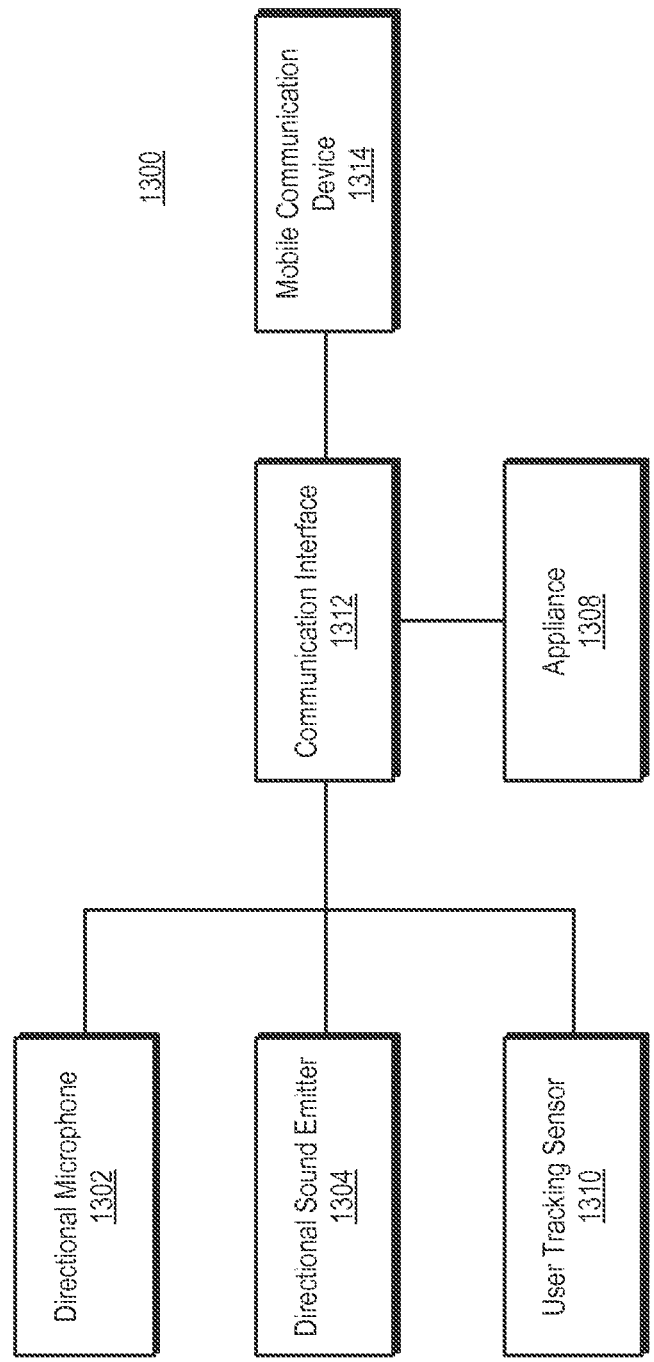
FIG. 13 is a block diagram of a system for automatically communicatively coupling users with appliances.

FIG. 13 is a block diagram of a system 1300 for automatically communicatively coupling users with appliances. The system 1300 may include a communication interface 1312. The communication interface 1312 may be communicatively coupled with a directional microphone 1302, a directional sound emitter 1304, and a user-tracking sensor 1310. A user may indicate, e.g., via vocal emissions detected by the directional microphone 1302, via a gesture, a facial expression, and/or an eye movement detected by the user-tracking sensor 1310, and/or the like that the user wishes to be communicatively coupled with an appliance 1308. The communication interface 1312 may authenticate the user and communicatively couple the user with the appliance 1308. The communication interface 1312 may be configured to translate vocal emissions from the user into communications, such as messages, understandable to the appliance 1308 and vice versa.

The appliance 1308 may be able to send communications to the user when authorized by the communication interface 1312. The communication interface 1312 may locate the user and deliver the communications. A user accessible via the directional sound emitter 1304 and/or directional microphone 1302 may receive the communication via the directional sound emitter 1304. If a user is not accessible via the directional sound emitter 1304 and/or directional microphone 1302, the communications interface may attempt to deliver the communication to a mobile communication device 1314 to which the communication interface 1321 is coupled. Alternatively, or in addition, communications may be sent to a computer, an e-mail address, etc. The communication interface 1312 may also, or instead, deliver incoming communications from the mobile communication device 1314 to the appliance 1308 if the incoming communications are authorized.

Figure 14:
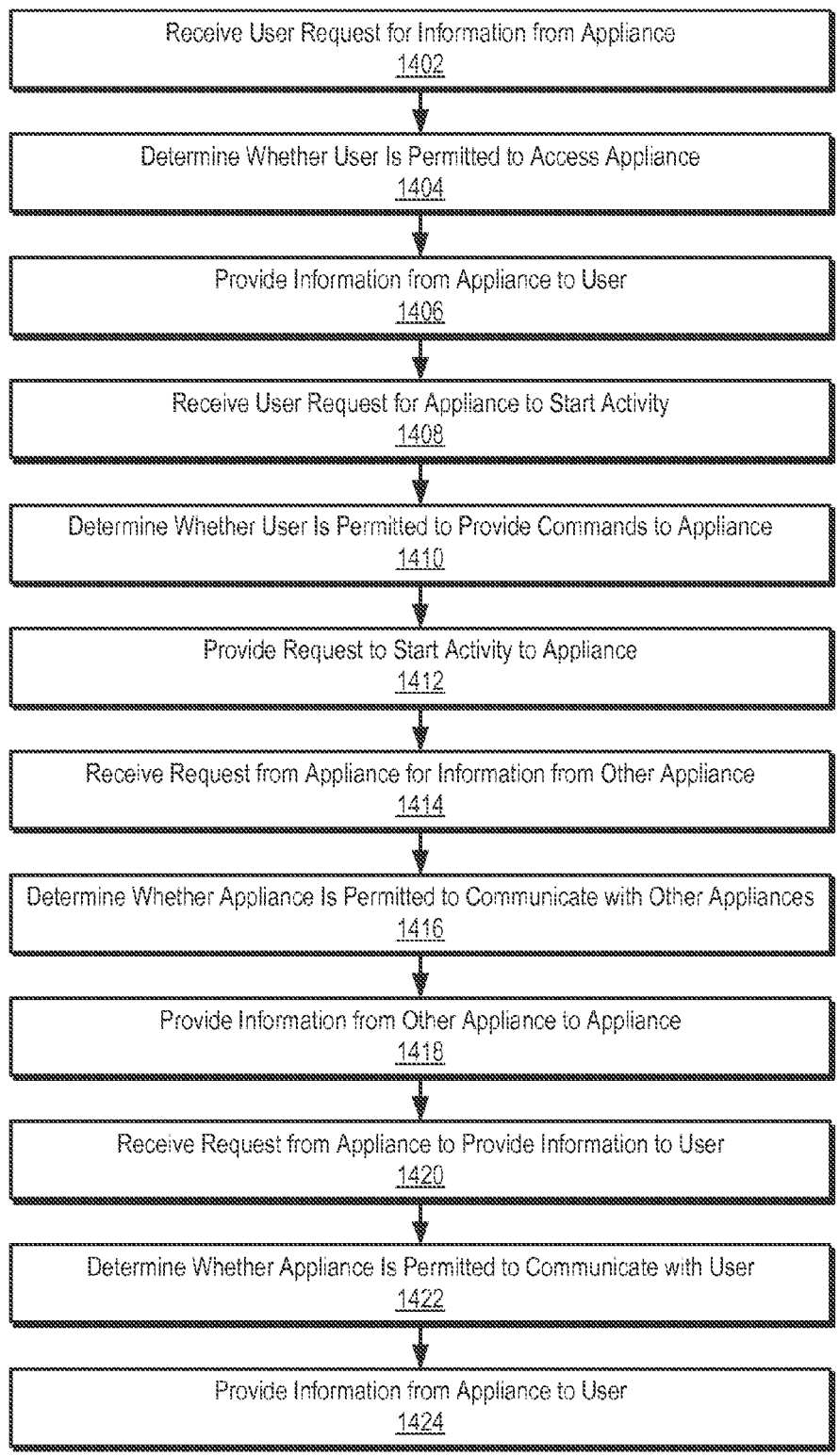
FIG. 14 is a flow diagram of a method for automatically communicatively coupling users with appliances.

FIG. 14 is a flow diagram of a method 1400 for automatically communicatively coupling users with appliances. A user request for information from an appliance may be received 1402 from a user. The user request may be for a current value of a setting, a current status, and/or the like. It may be determined 1404 whether the user is permitted to access the appliance in order to obtain the requested information (e.g., based on an identity of the user, a location of the user, access information provided by the user, etc.). The information may be provided 1406 from the appliance to the user if the user is permitted to obtain the requested information.

The user may wish to have the appliance begin and/or change an activity and/or task. A user request for the appliance to start an activity may be received 1408 from the user. It may be determined 1410 whether the user is permitted to provide commands to the appliance. The right to provide commands to the appliance may be distinct from the right to receive information from the appliance. For example, a repair company and/or manufacturer may be able to access information but unable to send commands. If the user is permitted to provide commands, the request to start the activity may be provided 1412 to the appliance.

The appliance may decide that it would like to receive information from another appliance. For example, the appliance may be planning to adjust its settings based on the received information and/or may plan on including the information in a report provided to the user. A request for information from the other appliance may be received from the appliance 1414. It may be determined 1416 whether the appliance is permitted to communicate with the other appliance, for example, based on the identity of the appliance, the identity of the other appliance, user settings, and/or the like. The request may be delivered to the other appliance, and the requested information from the other appliance may be provided 1418 to the appliance if communication is permitted. By restricting access, malicious attacks on appliances may be prevented. If a malicious attack is successful, restricting access may prevent any harm from spreading among appliances.

The appliance may decide to provide information to the user. For example, the appliance may alert the user to a change in activity, remind the user of a current status, and/or the like. A request may be received 1420 from the appliance to provide information to the user. It may be determined 1422 whether the appliance is permitted to communicate with the user. For example, the time of day, activity of the user, location of the user, identity of the user, urgency of the information to be provided, and/or the like may be considered when determining 1422 whether the appliance is permitted to communicate with the user. If the appliance is permitted to communicate with the user, the information may be provided 1424 to the user. The information may be provided 1424 via a directional sound emitter, via a mobile communication device, etc. Once any received communications have been routed to the appropriate location and/or denied, the method 1400 may enter a standby state until another communication is received and/or may end.

Figure 15:
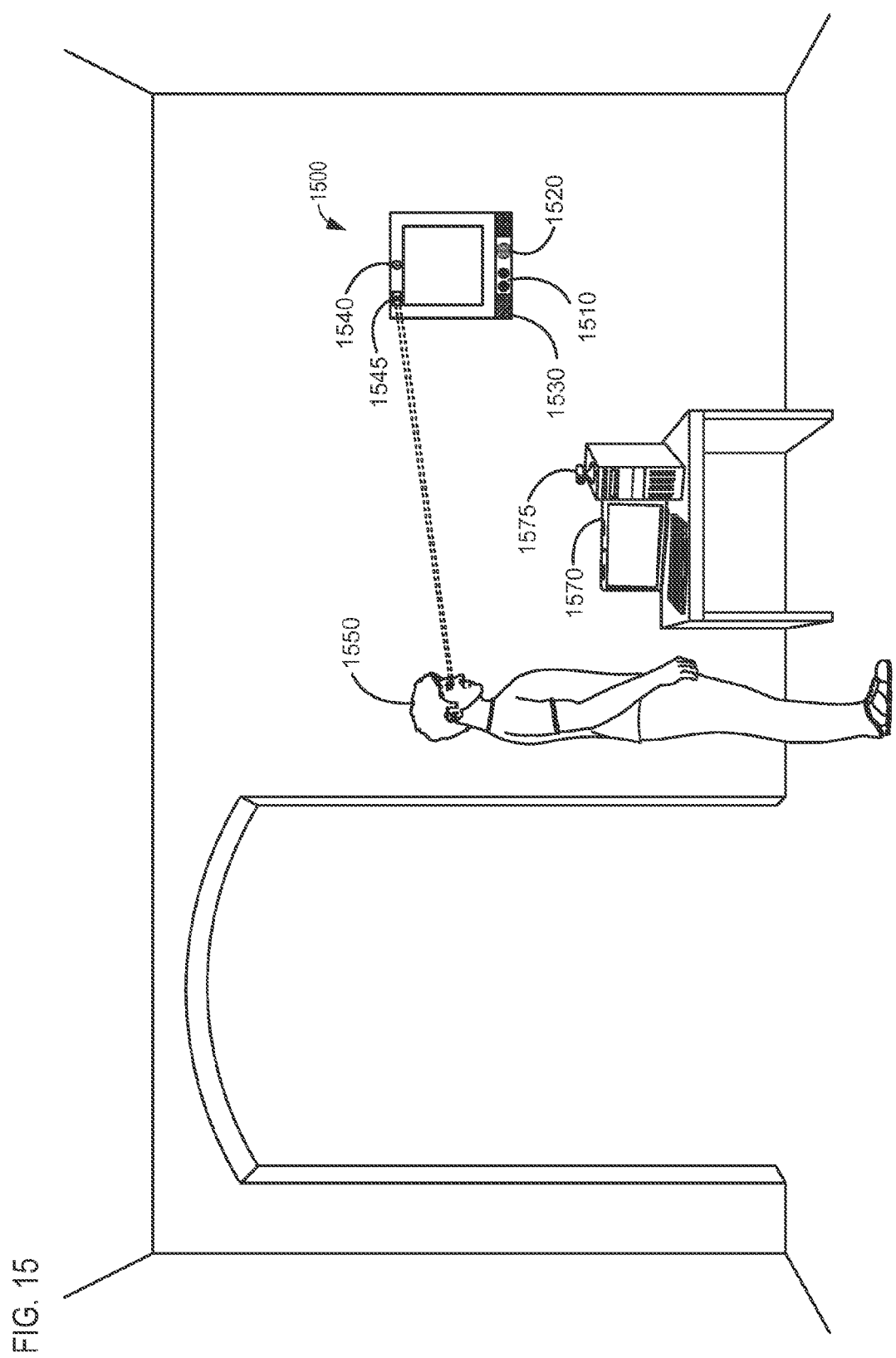
FIG. 15 is a perspective view of a hands-free intercom configured to provide video aided communication to a user.

FIG. 15 is a perspective view of a hands-free intercom 1500 configured to provide video aided communication to a user 1550. The hands-free intercom 1500 may include a user-tracking sensor 1510, a directional microphone 1520, and a directional sound emitter 1530. The hands-free intercom 1500 may also include a directional camera 1540 and/or a directional projector 1545. In the illustrated embodiment, the hands-free intercom 1500 is communicatively coupled to an alternate camera 1575 of a personal computer system 1570. In some embodiments, the hands-free intercom 1500 may include one of the directional camera 1540 and the alternate camera 1575 rather than both and/or may include multiple alternate cameras 1575. The illustrated embodiment shows the directional camera 1540 as being distinct from the user-tracking sensor 1510, but the directional camera 1540 may be part of the user-tracking sensor 1510.

The directional camera 1540 and/or the alternate camera 1575 may capture video of the user 1550. The directional camera 1540 and/or the alternate camera 1575 may be configured to track the user 1550 through, e.g., mechanical, optical, and/or digital adjustment of camera parameters, such as zoom, pan, focus, etc. The hands-free intercom 1500 may use the captured video to identify gestures, such as arm gestures, hand gestures, facial expressions, eye movements, etc., and/or to identify speech, for example, based on lip and/or mouth movements. The hands-free intercom 1500 may use the captured video in combination with captured vocal emissions to identify speech. The captured video may also, or instead, be sent to a remote entity (not shown).

The directional projector 1545 may be configured to deliver video to the user 1550. The directional projector 1545 may be configured to deliver the video directly to the user 1550, for example, by projecting the video onto and/or into the user's face or eyes (as illustrated by the dotted lines). In an embodiment, the directional projector 1545 may project the video onto the user's retina. The delivered video may include status information, which may be displayed as heads-up information in the user's field of vision. The delivered video may be of the remote entity. The directional projector 1545 may project the delivered video in a manner that encourages the user 1550 to look in a particular direction and/or to allow for more natural interaction between the user 1550 and the remote entity. The directional projector 1545 may project the video at a location in the user's field of vision proximate to the directional and/or alternate camera 1540, 1575 so that it appears like the user 1550 is looking into the camera 1540, 1575 when the user 1550 looks at the video. Specifically, the directional projector 1545 may project the eyes of a person in the video proximate to the camera 1540, 1575 so the user 1550 appears to make eye contact when the user 1550 attempts to make eye contact.

Figure 16:
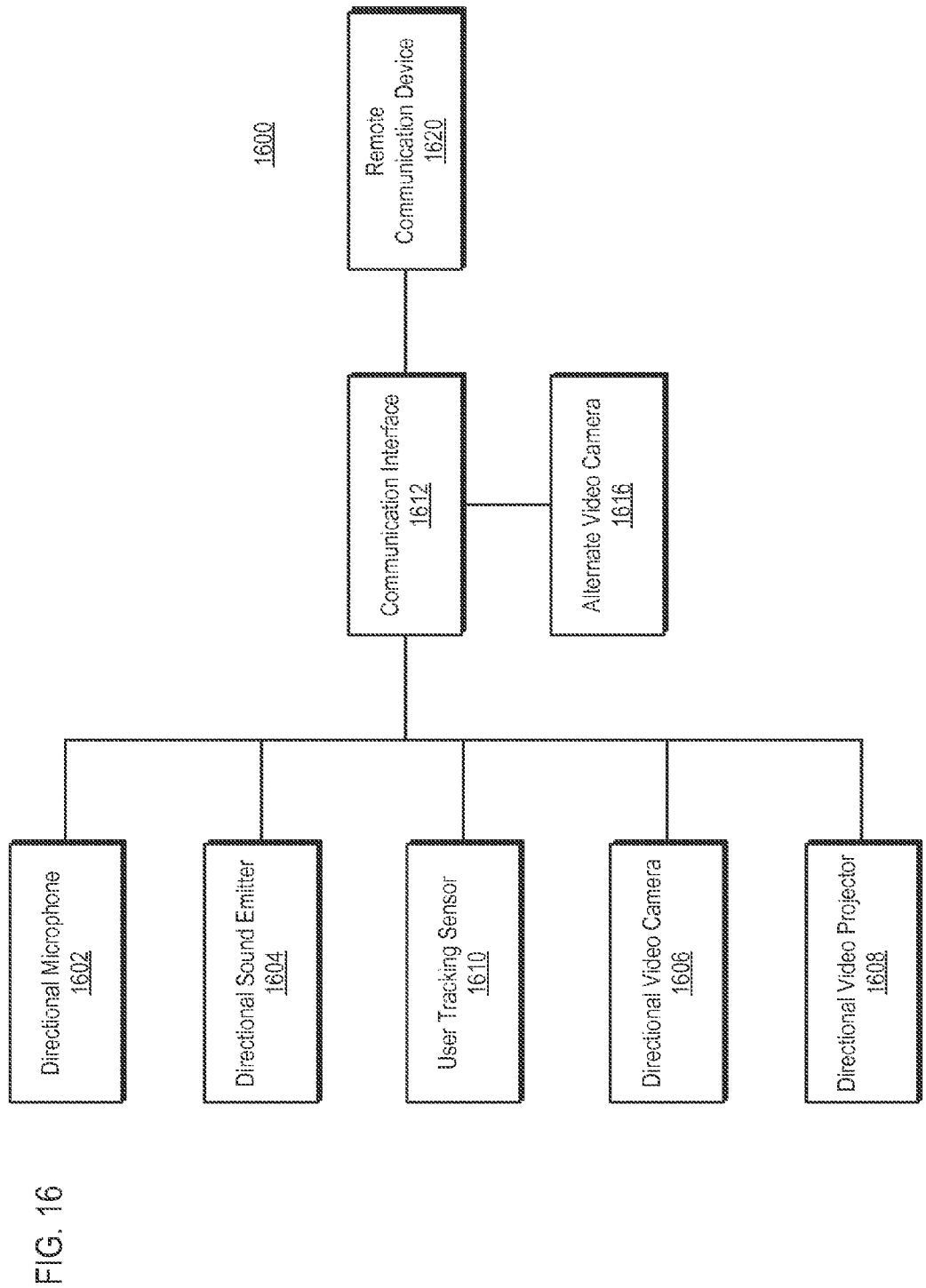
FIG. 16 is a block diagram of a system for providing video aided communication to a user.

FIG. 16 is a block diagram of a system 1600 for providing video aided communication to a user. The system 1600 may include a communication interface 1612, which may be communicatively coupled to a directional microphone 1602, a directional sound emitter 1604, a directional video camera 1606, a directional projector 1608, and/or a user-tracking sensor 1610. The user-tracking sensor 1610 may provide information about the user's location to the directional microphone 1602, directional sound emitter 1604, directional video camera 1606, and/or directional projector 1608 for tracking the user. The communication interface 1612 may be communicatively coupled to an alternate video camera 1616, which may be part of another system. The directional video camera 1606 and/or the alternate video camera 1616 may be part or all of the user-tracking sensor 1610.

The communication interface 1612 may be communicatively coupled to a remote entity 1620. The communication interface 1612 may communicatively couple the directional microphone 1602, directional sound emitter 1604, directional video camera 1606, and/or directional projector 1608 to the remote entity 1620. The communication interface 1612 may manage the transfer of video and/or voice to and from the remote entity 1620. The communication interface 1612 may manage access of the remote entity 1620 to the user (e.g., access to voice data, video data, etc.). The communication interface 1612 may be configured to receive and react to commands received from the user (e.g., vocal commands, gestures, facial expressions, eye movements, etc.). For example, the communication interface 1612 may receive a command from the user to reconfigure the communicative coupling (e.g., start video, stop video, adjust a camera, pause the coupling, mute the coupling, terminate the coupling, etc.) and may reconfigure the communicative coupling accordingly.

Figure 17:
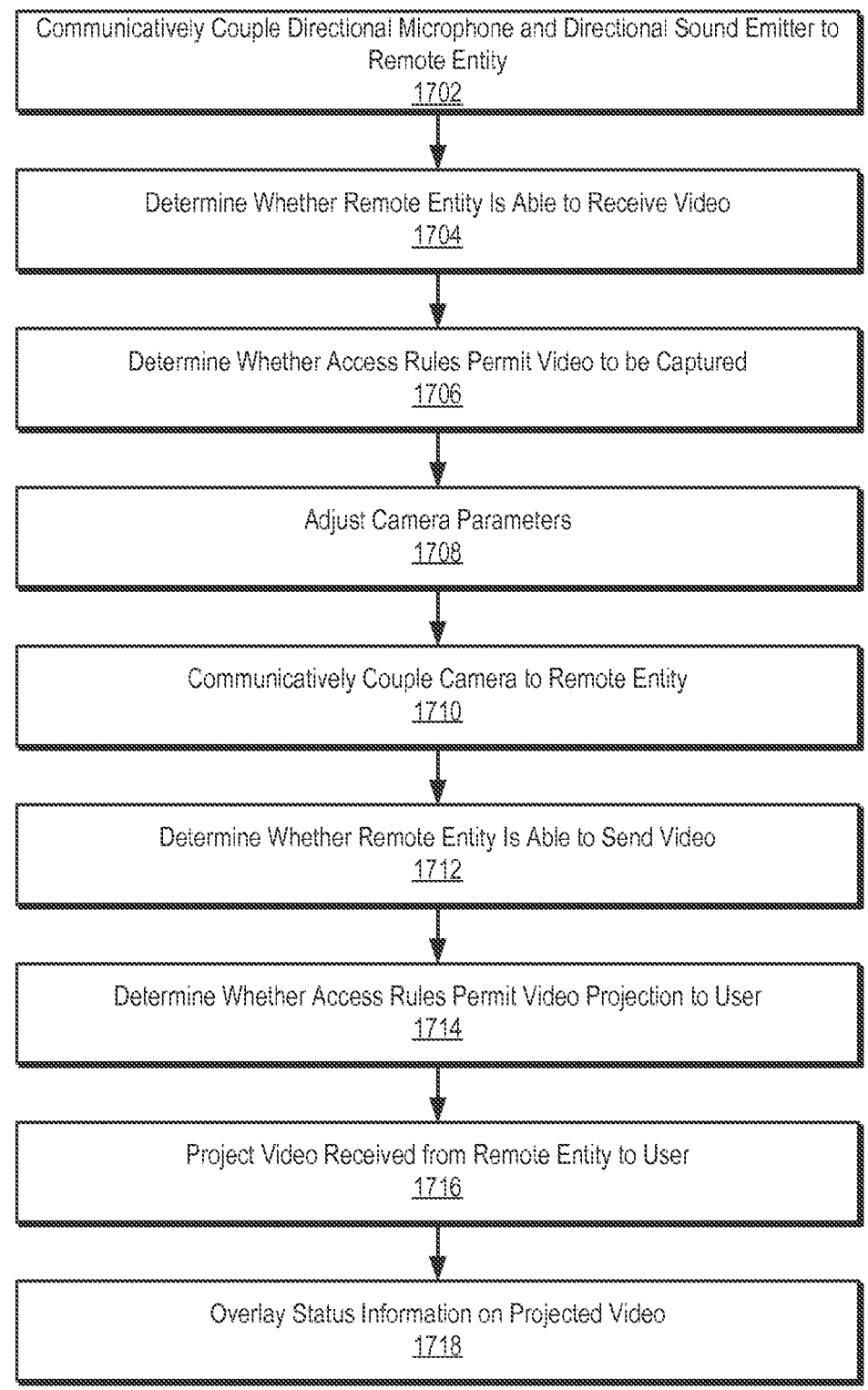
FIG. 17 is a flow diagram of a method for providing video enable communication to a user.

FIG. 17 is a flow diagram of a method 1700 for providing video enabled communication to a user of a hands-free intercom. A directional microphone and directional sound emitter may be communicatively coupled 1702 to a remote entity to allow the user to communicate with the remote entity. For example, the directional microphone and directional sound emitter may be communicatively coupled 1702 according to a previously discussed method. The hands-free intercom may determine 1704 whether the remote entity is able to receive video. The hands-free intercom may request information about the capabilities of the remote entity, and/or the remote entity may voluntarily provide information about its capabilities.

If the remote entity is able to receive video, the hands-free intercom may determine 1706 whether access rules permit video to be captured of the user. For example, the user may have specified that video should not be captured of the user in certain locations, during certain activities, at certain times and/or days, when certain people are present with the user, and/or the like. Each user may have specified which remote entities may receive video The user may have specified that video may be captured only after prompting the user, only in response to a user command, etc. Camera parameters for at least one camera may be adjusted 1708, for example, to allow video to be captured of the user. The camera parameters may be adjusted 1708 to capture video of a user-specified portion of the user (e.g., from the shoulders up, from the chest up, from the waist up, etc.). Focus and/or illumination may be adjusted to improve visibility of the user. The at least one camera may be communicatively coupled 1710 to the remote entity to provide video of the user to the remote entity. The video may be stereoscopic video if it has been determined (e.g., as part of step 1704) that the remote entity is able to receive stereoscopic video.

The hands-free intercom may determine 1712 whether the remote entity is able to send video. The ability of the remote entity to send video may be requested at the same or a different time as the request for the ability of the remote entity to receive video. Alternatively, or in addition, the remote entity may voluntarily provide information on its ability to send video at the same or a different time as it voluntarily provides information on its ability to receive video. The hands-free intercom may determine 1714 whether access rules permit video projection to the user. For example, the user may specify that video should not be received when the user is in certain locations, when the user is doing certain activities, at certain times and/or days, from certain remote entities, and/or the like.

If the remote entity is able to send video and the access rules permit video projection, video received from the remote entity may be projected 1716 to the user. The video may be projected into and/or onto the user's eye(s) and/or face. For example, the video may be projected onto the user's retina(s). In some embodiments, each image in a stereoscopic pair may be projected onto each of the user's retinas. The projected video may be configured to appear at a location within the user's field of vision that promotes eye contact. Status information may be overlaid 1718 onto the projected video. The status information may include an identity of the remote entity, a time that the communicative coupling has been active, a quality of the communicative coupling, whether the communicative coupling is being recorded, whether an eavesdropper is present, one or more commands that may delivered by the user, a command received from the user, and/or the like. As would be recognized by those of skill in the art, the steps of the method 1700 may be performed in various possible orders and/or may overlap in time.

Figure 18:
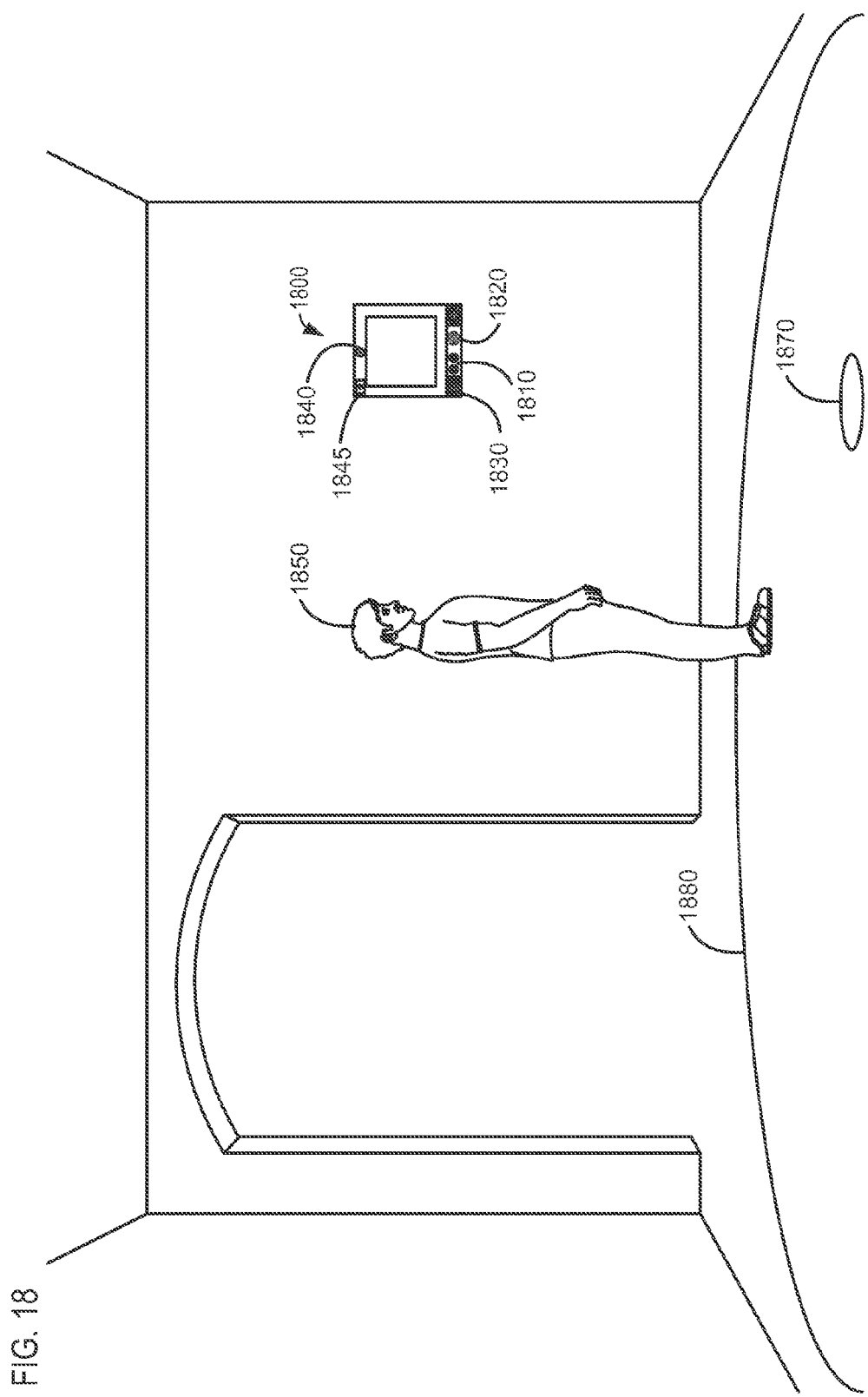
FIG. 18 is a perspective view of a hands-free intercom configured to induce a user to move to a desired location.

FIG. 18 is a perspective view of a hands-free intercom 1800 configured to induce a user 1850 to move to a desired location 1870. The hands-free intercom 1800 may also, or instead, be configured to induce the user 1850 to face in a desired orientation. The hands-free intercom 1800 may include a user-tracking sensor 1810, a directional microphone 1820, and a directional sound emitter 1830. In some embodiments, the directional microphone 1820 may be configured to be most sensitive to sounds coming from the desired location 1870, and/or the directional sound emitter 1830 may be configured to deliver a best sound quality to the desired location 1870. The hands-free intercom 1800 may also include a directional camera 1840 and/or a directional projector 1845. In some embodiments, the directional camera 1840 be configured to capture images having a highest image quality when capturing the desired location 1870, and/or the directional projector 1845 may be able to deliver a best video quality to the desired location 1870.

The hands-free intercom 1800 may have a connectivity boundary 1880 where connectivity may be lost with one or more components of the hands-free intercom 1800. For example, connectivity may be lost with the directional microphone 1820, the directional sound emitter 1830, the directional camera 1840, and/or the directional projector 1845. Alternatively, or in addition, the connectivity boundary 1880 may be where a wireless device will lose connectivity with the hands-free intercom 1800. Different components may lose connectivity at different points along the connectivity boundary 1880. For example, the connectivity boundary 1880 may be where any component loses connectivity, and/or where predetermined sets of components lose connectivity.

The hands-free intercom 1800 may be configured to indicate the desired location 1870 and/or the connectivity boundary 1880 to the user 1850. For example, the directional sound emitter 1830 and/or the directional projector 1845 may indicate the desired location 1870 and/or the connectivity boundary 1880 to the user 1850. Alternatively, or in addition, the hands-free intercom 1800 may indicate the relative position of the user (e.g., whether the user is outside the desired location 1870, whether the user is moving towards or away from the desired location 1870, whether the user is near the connectivity boundary 1880, etc.). In some embodiments, the hands-free intercom 1800 may induce the user to move to the desired location 1870 and/or away from the connectivity boundary 1880 without explicitly indicating the desired location 1870 and/or the connectivity boundary 1880. For example, the directional sound emitter 1830 and/or the directional projector 1845 may degrade the quality of provided audio and/or video and/or may adjust the apparent location of the audio and/or video to draw the user towards the desired location 1870.

Figure 19:
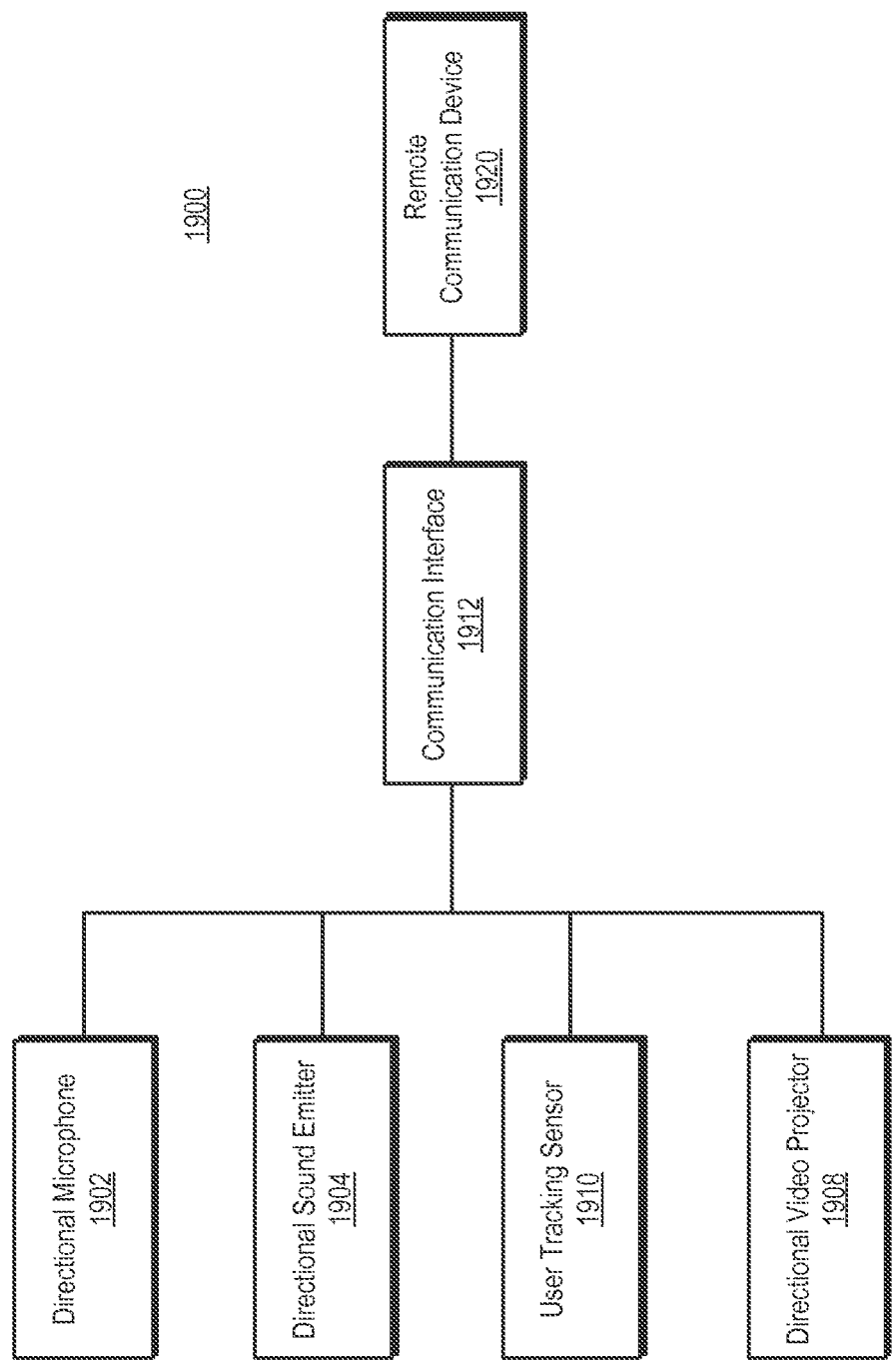
FIG. 19 is a block diagram of a system for inducing a user to move to a desired location.

FIG. 19 is a block diagram of a system 1900 for inducing a user to move to a desired location. The system 1900 may include a communication interface 1912, which may be communicatively coupled to a directional microphone 1902, a directional sound emitter 1904, a directional projector 1908, and/or a user-tracking sensor 1910. The communication interface 1912 may be communicatively coupled with a remote communication device 1920 and may attempt to position the user to maximize communication quality between the user and the remote communication device 1920. The user-tracking sensor 1910 may determine the location and/or orientation of the user. The communication interface 1912 may receive the determined location and/or orientation from the user-tracking sensor 1910. The communication interface 1912 may determine how the desired location, connectivity boundary, and/or desired orientation relate to the determined location and/or orientation from the user-tracking sensor 1910.

Based on the relative location and/or orientation of the user, the communication interface 1912 may determine whether to induce the user to move. The communication interface 1912 may indicate the desired location and/or orientation to the directional sound emitter 1904 and/or the directional projector 1908, which may induce the user to move to the desired location and/or turn to the desired orientation. Alternatively, or in addition, the communication interface 1912 may modify data being delivered to the directional sound emitter 1904 and/or the directional projector 1908 so that modified data is configured to induce the user to move to the desired location and/or turn to the desired orientation. For example, the communication interface 1912 may add additional signals to the data, may degrade the data, may alternate information for portions of the data, and/or the like.

Figure 20:
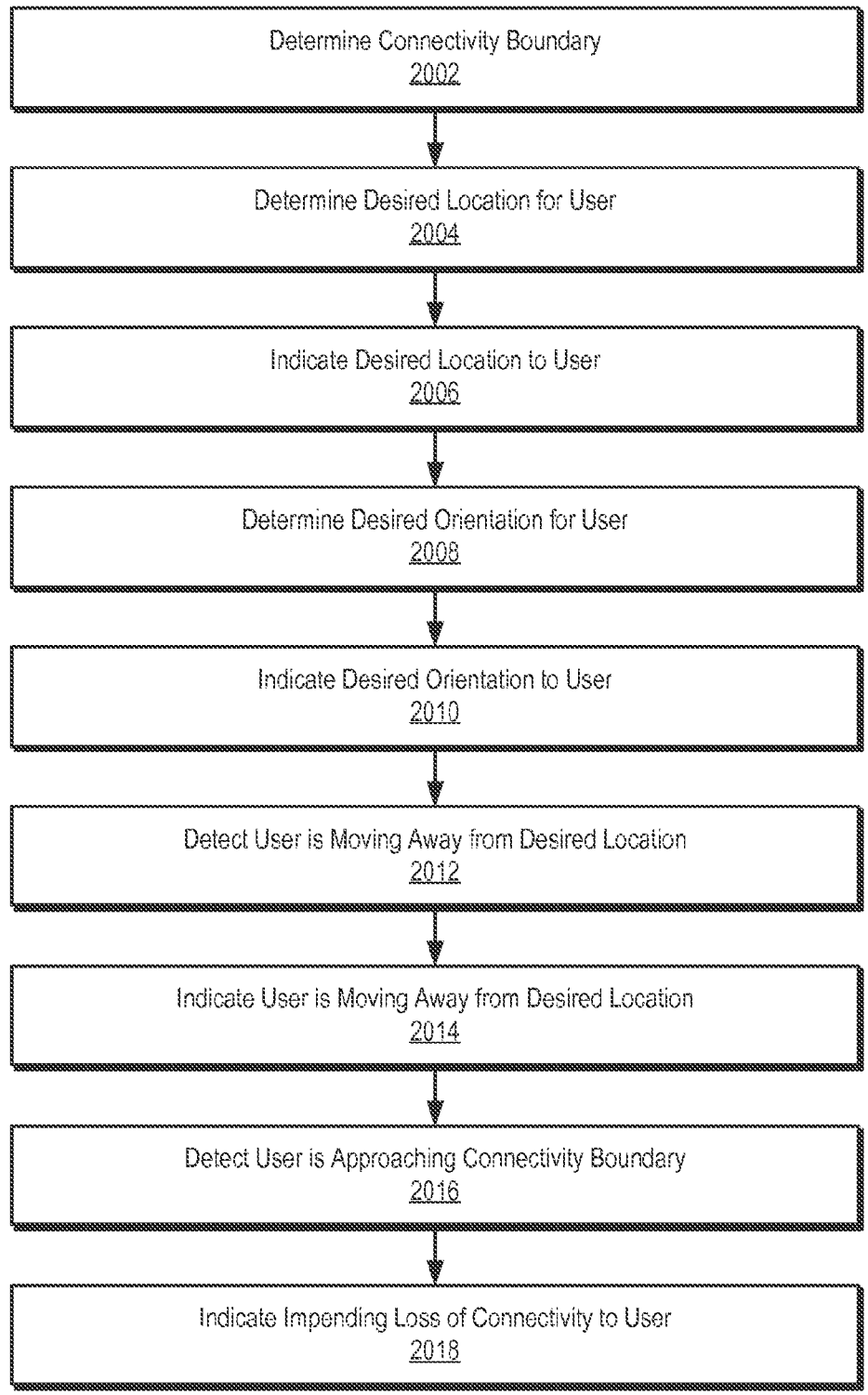
FIG. 20 is a flow diagram of a method for inducing a user to move to a desired location.

FIG. 20 is a flow diagram of a method 2000 for inducing a user to move to a desired location. The method 2000 may be performed while the user is connected to a remote communication device. The method 2000 may begin by determining 2002 a connectivity boundary. The connectivity boundary may be determined 2002 based on historical experience, based on a user indication, based on known characteristics of components of a hands-free intercom, based on detected features of a room, and/or the like. The location of the connectivity boundary may be stored for later comparison. In some embodiments, the connectivity boundary may not need to be known and thus may not be determined.

The method 2000 may include determining 2004 the desired location for the user. The desired location may be determined 2004 based on historical experience, based on a user indication, based on known characteristics of components of the hands-free intercom, based on detected features of the room, and/or the like. The desired location may be any size or shape. For example, the desired location may be a circle, a square, a triangle, etc. and may be 0.5 ft$^2$, 1 ft$^2$, 2 ft$^2$, 5 ft$^2$, etc. The desired location may be stored for later comparison.

The desired location may be indicated 2006 to the user. For example, a directional sound emitter may provide a vocal indication of the desired location, and/or a display may provide a visual indication of the desired location. The directional sound emitter and/or the display may indicate the position of the desired location relative to the room and/or relative to the user's position. The directional sound emitter and/or the display may convey the advantages of the desired location to the user. In alternate embodiments, the desired location may not be explicitly indicated 2006 to the user, but rather the user may be guided to the desired location by implicit indications or through semi- or subconscious manipulation of the user.

In some embodiments, a desired orientation may be determined 2008 for the user. The desired orientation may be determined 2008 based on historical experience, based on a user indication, based on known characteristics of components of the hands-free intercom, based on detected features of the room, and/or the like. The desired orientation may be indicated 2010 to the user (e.g., using the directional sound emitter, using the display, etc.). Alternatively, or in addition, the user may be informed that the user is facing away from and/or turning away from the desired orientation.

The user may move away from the desired location, and it may be detected 2012 that the user is moving away from the desired location. For example, a user-tracking sensor and/or a camera may determine a position of the user, and the position of the user may be compared to a stored indication of the desired location. Alternatively, or in addition, a decrease in connection quality with the user may be detected and it may be inferred the user is moving away. In some embodiments, it may be detected that the user is outside the desired location rather than that the user is moving away from the desired location.

The method 2000 may include indicating 2014 to the user that the user is moving away from the desired location. The directional sound emitter and/or the display may indicate 2014 to the user that the user is moving away from the desired location. The indication may include an explicit sound (e.g., a vocal indication, a predetermined sound, etc.) or visual indication (e.g., text, arrows, a predetermined image, etc.). The indication may include an implicit indication and/or modifications to delivered sound and/or video to induce the user to return to the desired location. For example, the quality of the sound and/or video may be degraded, the apparent source and/or location of the sound and/or video may be modified, an unpleasant stimulus may be added to the sound and/or video, and/or the like.

The user may continue to move away from the desired location and may approach a connectivity boundary. The method 2000 may include detecting 2016 the user is approaching and/or near the connectivity boundary. The proximity of the user to the connectivity boundary may be detected by the user-tracking sensor, by the camera, by the connection quality, and/or the like. For example, a detected position of the user may be compared to a saved indication of the connectivity boundary. The impending loss of connectivity may be indicated 2018 to the user. The directional sound emitter and/or the display may indicate the impending loss of connectivity to the user. The connectivity boundary may be indicated explicitly. Alternatively, or in addition, an implicit indication or other inducement may be adjusted to a maximum intensity as the user nears the connectivity boundary. In some embodiments, the level of inducement may be varied in intensity based on the position of the user relative to the desired location and the connectivity boundary and/or based on the actual loss in quality of the connection. Elements 2006-2018 of the method 2000 may be performed continuously and/or repeatedly while the user remains coupled to the remote communication device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A hands-free intercommunication system for positioning a user, the system comprising:
    a directional microphone configured to measure vocal emissions by the user;
    a directional sound emitter configured to deliver audio to the user by emitting ultrasonic sound waves modulated at audible frequencies of the audio, the ultrasonic sound waves selected to interfere with each other (i) in the air that is near the ears of the user or (ii) in a nonlinear acoustic material on or in the user such that the audio is delivered to the ears of the user; and
    a communication interface configured to communicatively couple the directional microphone and the directional sound emitter to a communication device of a remote entity,
    wherein the directional sound emitter is configured to produce:
        a first audio signal from the remote entity when the user is within a desired location, and
        a second audio signal from the remote entity when the user is not within the desired location, the second audio signal being transmitted alongside the first audio signal and used to induce the user to return to the desired location.

2. The system of claim 1, wherein the directional sound emitter is configured to degrade sound quality when the user is outside the desired location.

3. The system of claim 2, wherein the directional sound emitter is configured to decrease the volume when the user is outside the desired location.

4. The system of claim 2, wherein the directional sound emitter is configured to decrease an audio bit rate when the user is outside the desired location.

5. The system of claim 2, wherein the second audio signal comprises an overlaid distortion when the user is outside the desired location.

6. The system of claim 2, wherein the directional sound emitter is configured to degrade the sound quality based on a loss in quality of the measured vocal emissions.

7. The system of claim 2, wherein the directional sound emitter is configured to degrade the sound quality based on a distance of the user from the desired location.

8. The system of claim 1, wherein the directional sound emitter is configured to increase the volume when the user is outside the desired location.

9. The system of claim 1, wherein the directional sound emitter is configured to play an audio feedback sound when the user is outside the desired location.

10. The system of claim 1, wherein the directional sound emitter is configured to cause the audio to appear as though it is coming from the desired location.

11. The system of claim 10, wherein the directional sound emitter is configured to adjust a relative volume of the audio delivered to each ear of the user.

12. The system of claim 10, wherein the directional sound emitter is configured to adjust a relative time delay of the audio delivered to each ear of the user.

13. A hands-free intercommunication system for positioning a user, the system comprising:
    a directional microphone configured to measure vocal emissions by the user;
    a directional sound emitter configured to deliver audio to the user by emitting ultrasonic sound waves modulated at audible frequencies of the audio, the ultrasonic sound waves selected to interfere with each other (i) in the air that is near the ears of the user or (ii) in a nonlinear acoustic material on or in the user such that the audio is delivered to the ears of the user;
    a display configured to deliver video to the user; and a communication interface configured to communicatively couple the directional microphone and the directional sound emitter to a communication device of a remote entity, wherein the directional sound emitter is configured to produce:
  a first audio signal from the remote entity when the user is facing the display within a desired location, and
  a second audio signal from the remote entity when the user is not facing the display, the second audio signal being transmitted alongside the first audio signal and used to induce the user to face the display.

14. The system of claim 13, wherein the display is configured to adjust the delivered video to induce the user to move to the desired location.

15. The system of claim 13, wherein the display is configured to project the video into one or more eyes of the user, and wherein the display adjusts the video to induce the user to move to the desired location.

16. The system of claim 13, wherein the display is configured to provide an indication of the desired location.

17. The system of claim 16, wherein the indication of the desired location comprises text.

18. The system of claim 16, wherein the indication of the desired location comprises an arrow.

19. The system of claim 16, wherein the indication of the desired location comprises a map displaying the desired location.

20. The system of claim 16, wherein the indication of the desired location comprises a map displaying a boundary where the directional microphone, the directional sound emitter, or the display will lose connectivity with the user.

21. The system of claim 13, wherein the display is configured to display boundary lines for the desired location.

22. A non-transitory computer readable storage medium comprising program code configured to cause a processor to perform a method for positioning a user, the method comprising:
  causing a directional microphone to measure vocal emissions by the user;
  causing a directional sound emitter to deliver audio to the user by emitting ultrasonic sound waves modulated at audible frequencies of the audio, the ultrasonic sound waves selected to interfere with each other (i) in the air that is near the ears of the user or (ii) in a nonlinear acoustic material on or in the user such that the audio is delivered to the ears of the user;
  communicatively coupling the directional microphone and the directional sound emitter to a communication device of a remote entity; and
  causing the directional sound emitter to produce:
    a first audio signal from the remote entity when the user is within a desired location, and
    a second audio signal from the remote entity when the user is not within the desired location, the second audio signal being transmitted alongside the first audio signal and used to induce the user to move to the desired location.

23. The non-transitory computer readable storage medium of claim 22, wherein causing the directional sound emitter to induce the user to move comprises causing the directional sound emitter to provide a vocal indication of the desired location.

24. The non-transitory computer readable storage medium of claim 22, wherein causing the directional sound emitter to induce the user to move comprises causing the directional sound emitter to provide a vocal indication that the user is outside the desired location.

25. The non-transitory computer readable storage medium of claim 22, wherein causing the directional sound emitter to induce the user to move comprises causing the directional sound emitter to provide a vocal indication of a distance until the user reaches a boundary where the directional microphone or the directional sound emitter will lose connectivity with the user.

26. The non-transitory computer readable storage medium of claim 22, wherein causing the directional sound emitter to induce the user to move comprises causing the directional sound emitter to provide one of a plurality of vocal indications that the user is outside the desired location, wherein the one of the plurality of vocal indications is selected based on a distance of the user from the desired location.

27. The non-transitory computer readable storage medium of claim 22, wherein the method further comprises causing the directional sound emitter to induce the user to face in a desired orientation.

28. The non-transitory computer readable storage medium of claim 27, wherein causing the directional sound emitter to induce the user to face in the desired orientation comprises causing the directional sound emitter to induce the user to face a camera.

29. The non-transitory computer readable storage medium of claim 27, wherein causing the directional sound emitter to induce the user to face in the desired orientation comprises causing the directional sound emitter to cause the audio to appear as though it is coming from the desired orientation.

30. The non-transitory computer readable storage medium of claim 27, wherein causing the directional sound emitter to induce the user to face in the desired orientation comprises causing the directional sound emitter to degrade sound quality when the user is facing away from the desired orientation.

31. The non-transitory computer readable storage medium of claim 27, wherein causing the directional sound emitter to induce the user to face in the desired orientation comprises causing the directional sound emitter to play the second audio signal when the user is facing away from the desired orientation.

32. The non-transitory computer readable storage medium of claim 27, wherein causing the directional sound emitter to induce the user to face in the desired orientation comprises causing the directional sound emitter to provide a vocal indication of the desired orientation.

33. The non-transitory computer readable storage medium of claim 27, wherein causing the directional sound emitter to induce the user to face in the desired orientation comprises causing the directional sound emitter to provide a vocal indication that the user is facing away from the desired orientation.

34. A non-transitory computer readable storage medium comprising program code configured to cause a processor to perform a method for positioning a user, the method comprising:
  causing a directional microphone to measure vocal emissions by the user;
  causing a directional sound emitter to deliver audio to the user by emitting ultrasonic sound waves modulated at audible frequencies of the audio, the ultrasonic sound waves selected to interfere with each other (I) in the air that is near the ears of the user or (ii) in a nonlinear acoustic material on or in the user such that the audio is delivered to the ears of the user;

causing a display to deliver video to the user;
communicatively coupling the directional microphone and the directional sound emitter to a communication device of a remote entity;
causing the directional sound emitter to produce:
   a first audio signal from the remote entity when the user is facing the display within a desired location, and
   a second audio signal from the remote entity when the user is not facing the display, the second audio signal being transmitted alongside the first audio signal and used to induce the user to face the display.

35. The non-transitory computer readable storage medium of claim 34, wherein the method further comprises causing the display to induce the user to move to the desired location in response to a visual stimulus indicating the user is moving away from the desired location.

36. The non-transitory computer readable storage medium of claim 34, wherein the method further comprises causing the display to induce the user to move to the desired location by causing the display to degrade video quality when the user is outside the desired location.

37. The non-transitory computer readable storage medium of claim 34, wherein the method further comprises causing the display to induce the user to move to the desired location by causing the display to increase brightness when the user is outside the desired location.

38. The non-transitory computer readable storage medium of claim 34, wherein the method further comprises causing the display to induce the user to face in a desired orientation.

\* \* \* \* \*